United States Patent
Konishi et al.

(10) Patent No.: US 8,043,420 B2
(45) Date of Patent: Oct. 25, 2011

(54) LIQUID TANK

(75) Inventors: Akiko Konishi, Yokohama (JP); Tatsuro Nohara, Hiratsuka (JP); Katsumi Yokoo, Saitama (JP); Shotaro Ishii, Sagamihara (JP); Noboru Kanayama, Kanagawa (JP)

(73) Assignees: Komatsu Ltd., Tokyo (JP); Komatsu Utility Co., Ltd., Tokyo (JP)

( * ) Notice: Subject to any disclaimer, the term of this patent is extended or adjusted under 35 U.S.C. 154(b) by 446 days.

(21) Appl. No.: 12/282,636

(22) PCT Filed: Mar. 12, 2007

(86) PCT No.: PCT/JP2007/054771
§ 371 (c)(1),
(2), (4) Date: Oct. 16, 2008

(87) PCT Pub. No.: WO2007/119328
PCT Pub. Date: Oct. 25, 2007

(65) Prior Publication Data
US 2009/0056553 A1    Mar. 5, 2009

(30) Foreign Application Priority Data

Mar. 13, 2006  (JP) .................. 2006-068168
Sep. 29, 2006  (JP) .................. 2006-266847

(51) Int. Cl.
B01D 19/00    (2006.01)
(52) U.S. Cl. .......................... 96/211; 96/212
(58) Field of Classification Search .............. 96/211, 96/212, 210, 209, 206, 208, 216; 95/261
See application file for complete search history.

(56) References Cited

U.S. PATENT DOCUMENTS 2,316,729 A    4/1943  Tryon
2,590,754 A    3/1952  Cline
(Continued)

FOREIGN PATENT DOCUMENTS
CN    1459575 A    12/2003
(Continued)

OTHER PUBLICATIONS

International Preliminary Report on Patentability (7 pages), dated Sep. 13, 2008, and undated English translation thereof (3 pages), issued in connection with International Application Serial No. PCT/JP2007/054771.

(Continued)

*Primary Examiner* — Duane Smith
*Assistant Examiner* — Douglas Theisen
(74) *Attorney, Agent, or Firm* — Holtz, Holtz, Goodman & Chick, P.C.

(57) ABSTRACT

A fluid tank includes a tank main body that contains a fluid and a bubble removing device that is provided inside the main body and removes bubbles in the fluid. The main body includes a partition and a delivery port through which the fluid is fed to outside. The bubble removing device has an outflow port through which the fluid from which the bubbles have been removed flows to the inside of the main body and a bubble exhaust port through which the bubbles which have been removed are discharged to the inside of the main body. The delivery port is provided adjacent to the outflow port relative to the partition. The partition partitions the inside of the main body into a side in which the outflow port and the delivery port are provided and a side of the bubble exhaust port.

14 Claims, 15 Drawing Sheets

U.S. PATENT DOCUMENTS

| | | | |
|---|---|---|---|
| 4,865,632 A | | 9/1989 | Yano et al. |
| 7,105,044 B2 * | | 9/2006 | Konishi et al. .................. 96/208 |

FOREIGN PATENT DOCUMENTS

| | | |
|---|---|---|
| JP | 2-052013 A | 2/1990 |
| JP | 8-318103 A | 12/1996 |
| JP | 9-281282 A | 10/1997 |
| JP | 2002-195217 A | 7/2002 |
| JP | 2003-340203 A | 12/2003 |
| JP | 2004-84923 A | 3/2004 |

OTHER PUBLICATIONS

English Language International Search Report dated Jun. 19, 2007 issued in parent Appln. No. PCT/JP2007/054771.

Chinese Office Action dated Jul. 22, 2010 and English translation thereof, issued in counterpart Chinese Application No. 200780008233.4.

Japanese Office Action dated Jul. 5, 2011 in counterpart Japanese Application No. 2008-510759.

* cited by examiner

LIQUID TANK

This application is a U.S. National Phase Application under 35 USC 371 of International Application PCT/JP2007/054771 filed Mar. 12, 2007.

TECHNICAL FIELD

The present invention relates to a fluid tank, and in particular, to a fluid tank having a bubble removing device that removes bubbles (air) in a fluid.

BACKGROUND ART

In a conventional constriction machine, a portion of work equipment such as a cylinder is typically driven by a hydraulic fluid. Consequently, the construction machine is provided with a hydraulic circuit for driving the cylinder or the like. The hydraulic circuit is provided with, for example, a hydraulic tank and a pump for pumping the hydraulic fluid from the hydraulic tank. In addition, the hydraulic circuit is sometimes provided with a bubble removing device for removing bubbles in the hydraulic fluid because bubbles generated in the hydraulic circuit may damage the pump. Since demands for size reduction of components equipped on construction machines have been on the rise, a lot of construction machines are provided with a bubble removing device in a hydraulic tank in recent years.

The hydraulic fluid from which bubbles have been removed by the bubble removing device in the hydraulic tank flows out through an outflow port of the bubble removing device to the hydraulic fluid in the tank. The hydraulic fluid is fed out through a delivery port of the tank, and then, is pumped back to the hydraulic circuit by the pump. The bubbles removed by the bubble removing device are discharged to the hydraulic fluid in the tank through a bubble exhaust port provided on the bubble removing device independently of the outflow port. With this arrangement, since the bubble exhaust port of the bubble removing device and the delivery port of the hydraulic tank are closely disposed on account of the size reduction of the hydraulic tank, the hydraulic fluid containing the bubbles discharged from the bubble exhaust port may unfavorably be fed out from the delivery port together with the hydraulic fluid from which the bubbles have been removed.

To prevent this problem, a hydraulic tank including a guide portion that separates a side of the outflow port for the hydraulic fluid from which the bubbles have been removed and the delivery port of the tank from a side of the bubble exhaust port for the bubbles and guides the hydraulic fluid to the delivery port, the hydraulic fluid being substantially limited to the fluid that comes out from the outflow port, has been known (e.g., Patent Document 1).

Another tank has been known which includes a complex bubble removing device formed by covering with a closure plate a whole of several juxtaposed bubble removing devices, the complex bubble removing device being connected to the delivery port of the tank by a return pipe (e.g., Patent Document 2).

Furthermore, another tank is known which includes an inner chamber connecting a return port for the hydraulic fluid in an upper portion of the tank and a delivery port in a lower portion of the tank, the inner chamber housing a spiral baffle, the baffle being provided with a hollow shaft along a central axis of the baffle, the hollow shaft being provided with ventilation holes on a circumferential wall of the hollow shaft (e.g., Patent Document 3). In the tank disclosed in Patent Document 3, flow of the hydraulic fluid on the spiral baffle in the inner chamber generates a swirl, so that hydraulic fluid containing bubbles that are drawn to the central portion of the inner chamber is discharged through the hollow shaft in the central portion of the inner chamber to the outside of the tank.

Patent Document 1: JP-A-2004-84923
Patent Document 2: JP-A-08-318103 (FIGS. 9 and 10)
Patent Document 3: U.S. Pat. No. 2,316,729

DISCLOSURE OF THE INVENTION

Problems to be Solved by the Invention

However, in the tank disclosed in Patent Document 1, because the delivery port of the tank is not entirely covered by the guide portion, incidental suction of the bubbles discharged from the bubble exhaust port is not completely prevented. This is often the case when size of the tank is reduced because size reduction of the tank accompanies reduction of the distance between the delivery port of the tank and the bubble exhaust port.

In the tank disclosed in Patent Document 2, when an amount of the fluid sucked by the pump is not equal to the amount of the fluid returned to the tank, the amounts are adjusted to be equal by a branch pipe provided to a pump suction pipe. However, because the complex bubble removing device occupies a large space in the tank, the branch pipe is disposed at a lateral end facet section of the tank. In other words, the branch pipe is disposed closer to the pump than to the outflow port of the bubble removing device. The fluid containing bubbles in the tank may be flowed directly into the pump, resulting in the pump sucking the bubbles. In addition, the complex bubble removing device is connected and fixed to the inlet piping from the outside of the tank and to the outlet piping to the outside of the tank. Such an arrangement requires assembling or disassembling of the bubble removing device and the piping at manufacturing and maintaining the tank. As a result, assemble efficiency is low.

In the tank disclosed in Patent Document 3, a return port for the hydraulic fluid and an inner chamber capable of removing bubbles from the hydraulic fluid are connected by piping in the tank. Such an arrangement requires assembling or disassembling the piping at attaching the inner chamber to or detaching the inner chamber from the inside of the tank. In addition, several baffles horizontally extend from an outer surface of the lateral wall that forms the inner chamber. The baffles interfere with the tank at attaching and detaching the inner chamber. Thus, the attaching and detaching of the inner chamber are cumbersome, and assemble efficiency of the tank is low.

An object of the present invention is to provide a fluid tank capable of securely removing bubbles and excellent in assemble efficiency.

Means for Solving the Problems

A fluid tank according to an aspect of the present invention is a fluid tank that contains a fluid, including: a tank main body that contains the fluid; and a bubble removing device that is provided to an inside of the tank main body and removes bubbles contained in the fluid, in which the tank main body includes at least one subordinate return port through which the fluid not flowing through the bubble removing device returns to the inside of the tank main body, a partition that partitions the inside of the tank main body to at least two sides and a delivery port through which the fluid is fed to an outside, the bubble removing device comprises an outflow port through which the fluid from which bubbles have been removed flows to the inside of the tank main body and a bubble exhaust port through which the bubbles having been removed are discharged to the inside of the tank main body, the subordinate return port is provided adjacent to the bubble exhaust port relative to the partition, the delivery port is provided adjacent to the outflow port relative to the partition, and the partition partitions the inside of the tank main body to a side in which the outflow port and the delivery port are provided and a side of the bubble exhaust port.

Here, the delivery port is a portion where the fluid in the tank main body is taken in at being fed to the outside. The delivery port includes an arrangement in which the fluid in the tank main body is sucked to be fed to the outside.

According to the aspect of the invention, the partition provided in the tank main body partitions the inside of the tank main body to at least two sides, one side being the side including the outflow port through which the fluid from which bubbles have been removed (hereafter occasionally referred to as "bubble-removed fluid") and the delivery port through which the fluid is fed to the outside of the tank, and another side being the side including the bubble exhaust port through which the bubbles having been removed are discharged. With this arrangement, the fluid containing bubbles can be prevented from flowing into the side of the delivery port, so that the bubble-removed fluid flows to the delivery port from the outflow port. Accordingly, because the fluid containing bubbles is prevented from being fed to the outside line through the delivery port, bubbles in the hydraulic fluid can be securely removed.

In addition, the subordinate return port through which the fluid not flowing through the bubble removing device returns is provided adjacent to the bubble exhaust port of the bubble removing device relative to the partition. Consequently, the fluid containing bubbles which has returned through the subordinate return port is prevented from flowing into the side of the delivery port. Accordingly, because the fluid containing bubbles is prevented from being fed to the outside line from the delivery port, bubbles in the hydraulic fluid can be more securely removed.

In the above arrangement, the partition is preferably fixed to the tank main body.

With this arrangement, because the partition is fixed to the tank main body, at attaching the bubble removing device to the tank main body and at detaching the bubble removing device from the tank main body, interference between the bubble removing device and the tank main body is reduced with respect to the case in which the partition is fixed to the bubble removing device. Accordingly, the bubble removing device can be attached and detached smoothly. As a result, assemble efficiency of the fluid tank is improved.

In the above arrangement, the partition preferably partitions the inside of the tank main body to an upper side and a lower side.

With this arrangement, because the partition partitions the inside of the tank main body to an upper side and a lower side, the upper side in which the fluid containing bubbles are likely to be collected and the lower side containing a greater amount of the bubble-removed fluid can be partitioned. Here, the bubble removing device normally is disposed in the tank main body in a manner that the bubble exhaust port is provided to a vertically upper side and the outflow port is provided to a vertically lower side. Consequently, in the case such a bubble removing device is employed, the inside of the tank main body can be easily partitioned to the outflow port side and the bubble exhaust port side. Accordingly, assemble efficiency of the fluid tank can be further improved.

In the above arrangement, the partition is preferably attached to the tank main body in a manner forming a convex shape that curves upward.

With this arrangement, because the partition is attached to the tank main body in a manner forming a convex shape that curves upward, in the case the fluid surface in the tank main body is inclined, a vertical position of the fluid surface is prevented from being lower than the partition at both horizontal ends. Accordingly, in the case the fluid surface in the tank main body is inclined, air is prevented from entering the side adjacent to the delivery port relative to the partition. As a result, air can be prevented from being mixed with the hydraulic fluid in the side adjacent to the delivery port.

In the above arrangement, the bubble exhaust port is provided in the fluid in the inside of the tank main body.

With this arrangement, because the bubble exhaust port of the bubble removing device is provided in the fluid in the tank main body, the fluid containing bubbles from the bubble exhaust port does not fall on the fluid surface. Accordingly, the fluid containing bubbles is prevented from falling on the fluid surface and being taken into the fluid. As a result, generation of new bubbles in the tank main body can be prevented.

In the above arrangement, the partition preferably includes an opening in which the bubble removing device is inserted, and a gap having a substantially uniform width is preferably circumferentially formed between an inner circumference of the opening and an outer circumference of the bubble removing device inserted in the opening.

With this arrangement, a gap having a substantially uniform width is circumferentially formed between an inner circumference of the opening of the partition and an outer circumference of the bubble removing device inserted in the opening. As a result, a difference between an amount of the hydraulic fluid returning from the outside line and an amount of the hydraulic fluid fed through the delivery port to the outside line, that is, excess or deficiency of the fluid in the feeding space, is adjusted. Because the bubble removing device is inserted in the opening of the partition, and the gap is formed between the inner circumference of the opening of the partition and the outer circumference of the bubble removing device, the gap is disposed at a position farther apart from the delivery port than the outflow port of the bubble removing device is. Accordingly, the fluid including bubbles in the tank is prevented from directly flowing into the delivery port through the gap.

Furthermore, because the bubble removing device is less likely to interfere with the guide at inserting the bubble removing device into the opening owing to the gap, the bubble removing device can easily be attached to the fluid tank at manufacturing and maintaining the fluid tank.

In the above arrangement, the partition is preferably a guide that covers surroundings of the bubble removing device and the delivery port and guides the fluid from which the bubbles have been removed by the bubble removing device to the delivery port.

With this arrangement, the partition is a guide that covers surroundings of the bubble removing device and the delivery port and guides the fluid from which the bubble have been removed by the bubble removing device to the delivery port. Accordingly, the bubble-removed fluid is securely guided to the delivery port. In addition, it becomes difficult for the fluid containing bubbles in the space outside the guide to flow into an inside of the guide, so that the fluid containing bubbles is prevented from being fed through the delivery port to the outside line.

In the above arrangement, the fluid tank preferably further includes a filter for filtering the fluid, the guide is preferably cylindrical, and the filter, the bubble removing device, the guide and the delivery port are preferably substantially linearly disposed.

With this arrangement, the elements in the tank are substantially linearly disposed. Accordingly, the tank main body is formed thin. As a result, an installation area of the fluid tank can be reduced.

In addition, the elements that may take in air when the fluid surface is lowered, such as the bubble removing device or the like, are disposed closer to the center of the tank where the influence of lowering of the fluid surface is minor. Accordingly, air is prevented from being taken in. As a result, bubbles can be more securely removed.

In the above arrangement, the guide is preferably shaped in a box having an inclined upper surface, and an air vent hole is provided to an uppermost portion continued from the upper surface.

With this arrangement, the upper surface of the guide is inclined upward toward the center of the tank and an air vent hole is provided to an uppermost portion continued from the upper surface. Consequently, even if the fluid containing bubbles enters the feeding space in the guide, the bubbles are guided along the inclination of the upper surface to the air vent hole and discharged through the air vent hole. Accordingly the fluid containing bubbles is less likely to be fed through the delivery port. As a result, bubbles can be more securely removed.

In the above arrangement, the air vent hole of the guide is preferably provided substantially at the center of the tank main body with respect to the horizontal direction.

With this arrangement, the air vent hole of the guide is provided substantially at the center with respect to the horizontal direction of the tank main body. Accordingly, even when the fluid surface is greatly inclined on account of acceleration and deceleration caused by moving of a machine in which the fluid tank is installed or on account of the machine taking a position on an inclined surface, the air vent hole is not exposed over the fluid surface. As a result, air can be prevented from entering the inside of the guide.

In the above arrangement, the fluid tank preferably further includes a drain port through which internal hydraulic fluid is drained, and the drain port is preferably stretched over an inside and an outside of the guide.

With this arrangement, the drain port is stretched over the inside and the outside of the guide. Consequently, the feeding space in the guide and the outside space outside the guide are intercommunicated via the drain port. Excess and deficiency of the fluid in the feeding space is adjusted also via this communication.

BEST MODE FOR CARRYING OUT THE INVENTION

First Embodiment

Figure 1:
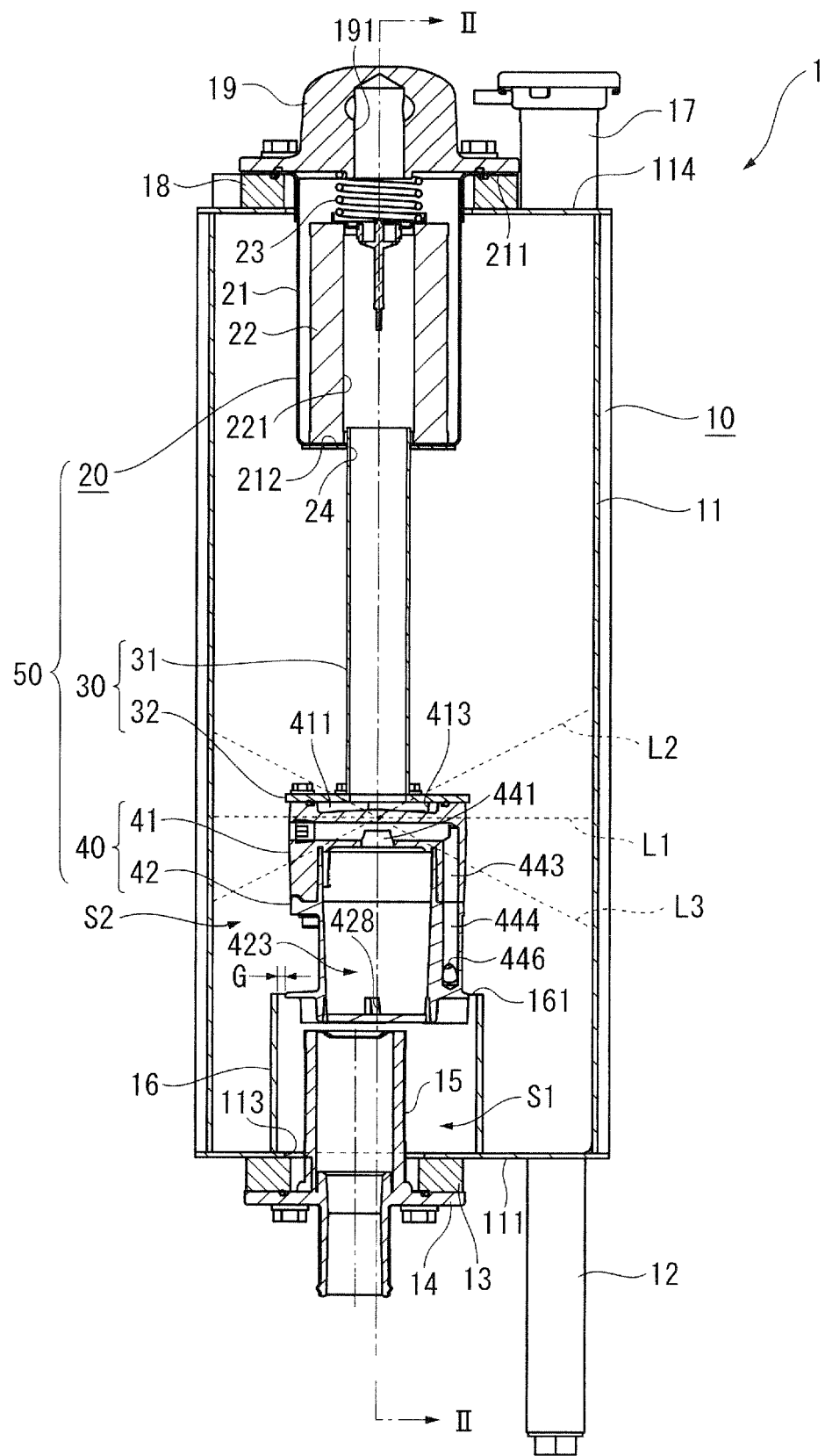
FIG. 1 is a front view showing a cross section of a fluid tank according to a first embodiment of the invention.

A first embodiment of the present invention will be described below with reference to FIGS. 1 to 8.

A hydraulic tank (fluid tank) 1 is equipped on a construction machine, for example, and is used to contain a hydraulic fluid (a fluid) for operating work equipment. For this purpose, the hydraulic tank 1 is connected via a hydraulic line with a pump (not shown), a control valve, a cylinder that forms the work equipment, an oil cooler and the like, which form a hydraulic circuit and a hydraulic system.

As shown in FIGS. 1 to 4, the hydraulic tank 1 includes a tank main body 10, a filter 20, a connecting portion 30 and a bubble removing device 40. The filter 20, the connecting portion 30 and the bubble removing device 40 are contained in the tank main body 10 in a so-called "hanging in midair" manner.

Specifically, the tank main body 10 includes a box-shaped body 11, which includes a bottom plate 111 on which a drain port 112 for draining a hydraulic fluid in the hydraulic tank 1 and a delivery port 113 to an outside line such as a hydraulic circuit or the like are provided.

A drain pipe 12 communicated with the drain port 112 is provided to a lower surface of the bottom plate 111. A lower flange 13 is fixed to the lower surface of the bottom plate 111 in a manner surrounding the delivery port 113 by welding or the like. A joint member 14 for connection with the outside line is bolted to the lower flange 13 via a seal member (not shown). A vertical suction strainer (hereafter simply called a strainer) 15 integrated with the joint member 14 is contained in the body 11.

The delivery port 113 and a cylindrical guide 16 that covers the strainer 15 are provided to an upper surface of the bottom plate 111. The guide 16 includes an upwardly opened opening 161. A lower end of the bubble removing device 40 hanging over the strainer 15, that is, a portion that includes an outflow port 428 through which a hydraulic fluid from which bubbles have been removed flows out, is inserted in the opening 161. Here, a gap G having a substantially uniform width is circumferentially formed between an inner circumference of the opening 161 and an outer circumference of the bubble removing device 40. In other words, in the hydraulic tank 1, the guide 16 covers surroundings of the delivery port 113, the strainer 15 and the lower end of the bubble removing device 40 while keeping the gap G between the opening 161 and the bubble removing device 40. With this arrangement, the hydraulic fluid flowing out of the bubble removing device 40 in a feeding space S1 is smoothly guided toward the strainer 15. In addition, a hydraulic fluid containing bubbles in an out-of-guide space S2 outside the guide 16 is prohibited from entering the feeding space S1.

A fluid supply port 17 for supplying a new hydraulic fluid and an upper flange 18 are welded or the like to an upper plate 114 of the body 11. A cover member 19 is detachably bolted to the upper flange 18. A return port 191 through which the hydraulic fluid returns from the cylinder or the like of the work equipment is provided to the cover member 19. The return port 191 is communicated with an inside of the filter 20.

The filter 20 includes a cylindrical filter body 21 and, together with the cover member 19, is detachably fixed to the upper flange 18 via a flange 211 provided to an upper end of the filter body 21. A cylindrical filter element 22 is contained in the filter body 21 and biased to a bottom 212 of the filter body 21 by a spring 23. A hole 24 is formed at a substantially central portion of the bottom 212. A vertical pipe 31 of the connecting portion 30 is attached to the filter body 21 in a manner inserted in a hollow portion 221 of the filter element 22 through the hole 24.

The connecting portion 30 includes the vertical pipe 31 communicated with the filter 20 and an attaching flange 32. The attaching flange 32 is fixed to a lower end of the vertical pipe 31. The bubble removing device 40 communicated with the connecting portion 30 is bolted to the attaching flange 32.

A path assembly 50 is formed by the filter 20, the connecting portion 30 and the bubble removing device 40. In the path assembly 50, these elements, insides of which are intercommunicated, are substantially linearly arranged in a downwardly sequential manner and connected with the cover member 19. With this arrangement, the hydraulic fluid having returned from the cylinder of the work equipment or the like flows from the return port 191 of the cover member 19 through the filter 20 and the connecting portion 30 into the bubble removing device 40.

Figure 5:
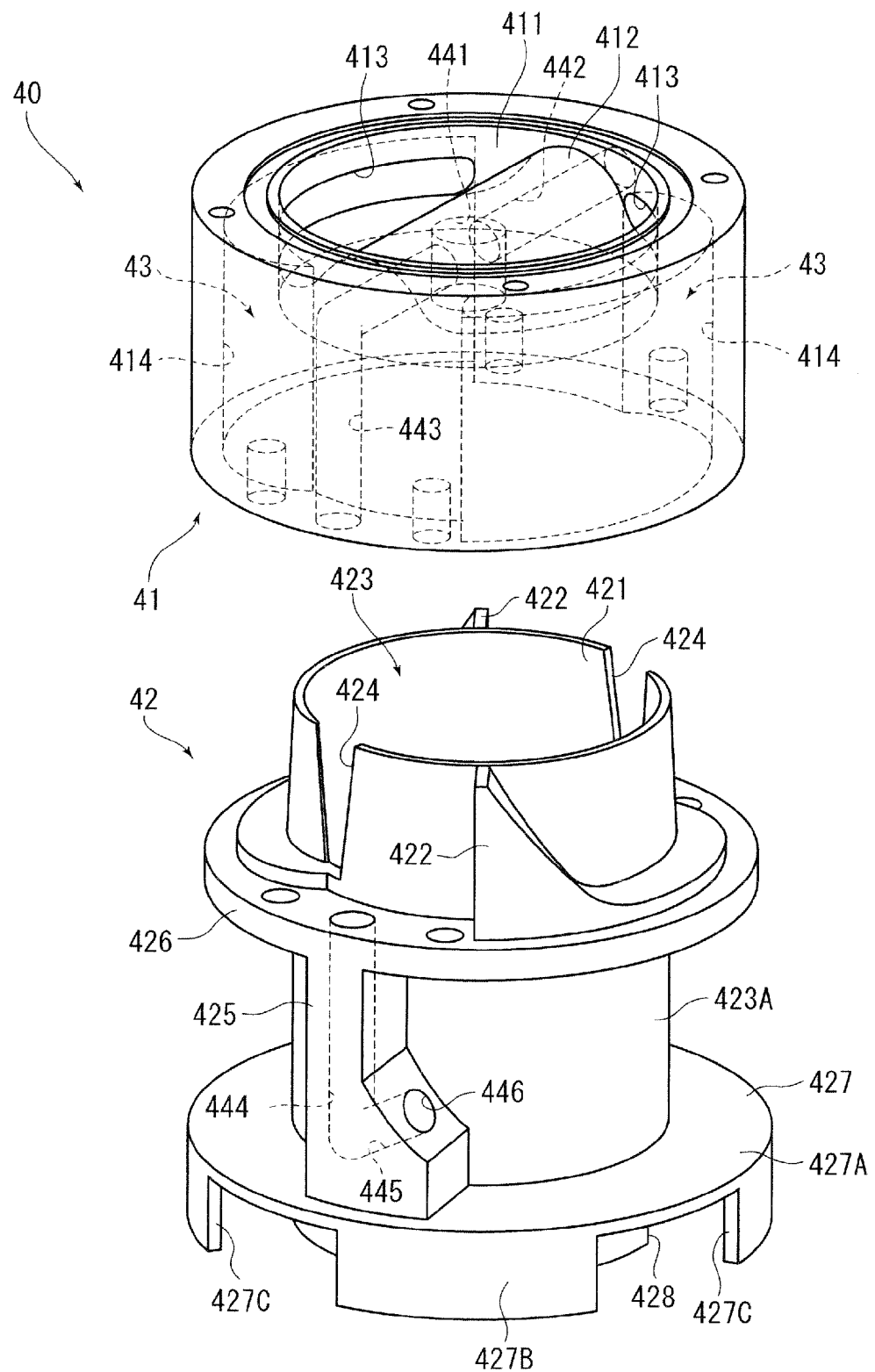
FIG. 5 is an exploded perspective view showing a bubble removing device according to the first embodiment.
Figure 6:
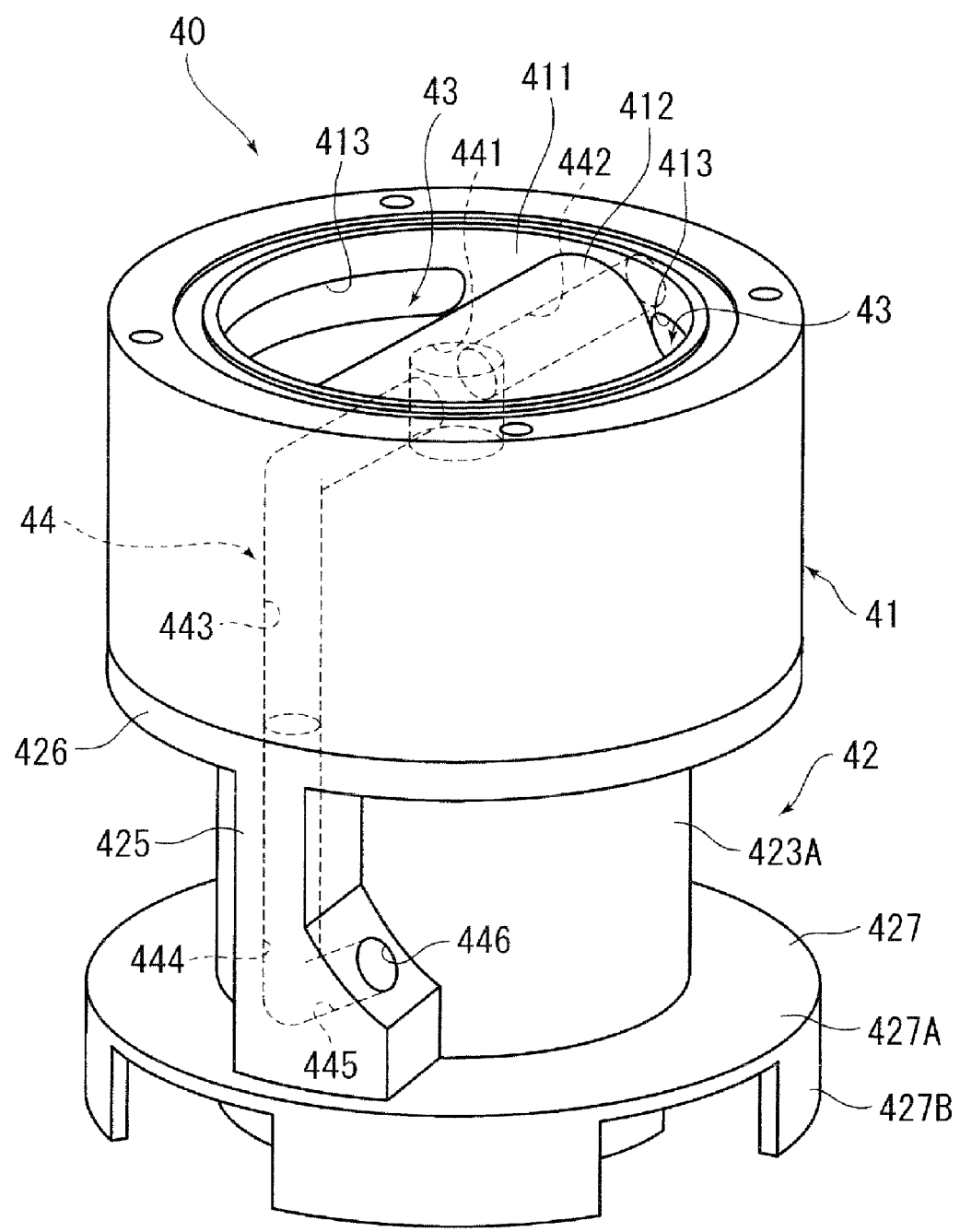
FIG. 6 is a perspective view showing the bubble removing device according to the first embodiment.
Figure 7:
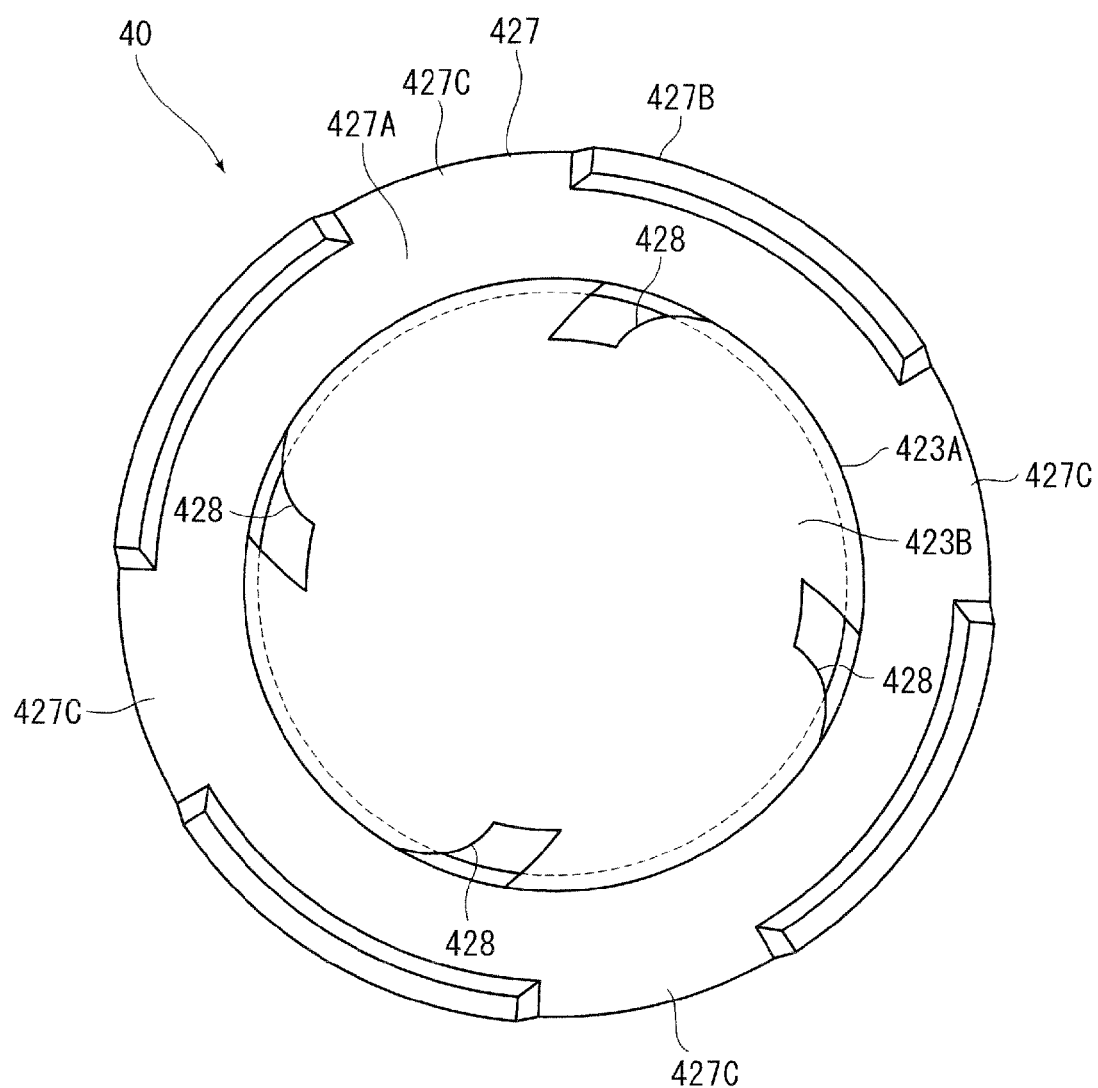
FIG. 7 is a bottom view showing the bubble removing device according to the first embodiment.

The bubble removing device 40 is of a cyclone type, in which bubbles are separated as follows: a swirl (a vortex) is generated in a hydraulic fluid; bubbles, having a smaller specific gravity, are drawn toward the center by centrifugal force; and the bubbles are discharged through a dedicated line. As shown in FIGS. 5 to 7, the bubble removing device 40 is formed by a first member 41 bolted to a lower surface of the attaching flange 32 and a second member 42 bolted to a lower side of the first member 41 and having an upper portion contained in the first member 41.

The first member 41 is shaped in a cylinder having a top ceiling. A hydraulic fluid input port 411 downwardly dented to form a U-shape is provided on a top surface of the first member 41. A flow direction changing section 412 upwardly bulging along a radial direction is provided on an inner upper surface of the input port 411. The flow direction changing section 412 has a smoothly curved surface and separates the hydraulic fluid which has flowed down on the input port 411 to streams in two different directions. In addition, a pair of lateral openings 413 shaped in an elongated hole along a circumferential direction and radially opposed to each other are formed on the inner circumference of the input port 411. The hydraulic fluid separated by the flow direction changing section 412 is guided to the lateral openings 413. Furthermore, a pair of radially opposing inlet flow path forming sections 414 dented in a manner reducing a thickness of the first member 41 are formed on an inner circumference of a hollow portion of the entire first member 41. The inlet flow path forming sections 414 are communicated with the lateral openings 413.

The second member 42 is shaped in a cylinder having a bottom and includes an upwardly protruding inlet flow path forming wall 421 in an upper portion of the second member 42. A pair of outwardly bulging guide sections 422 are provided on an outer peripheral surface of the inlet flow path forming wall 421 in a radially opposing manner. When the inlet flow path forming wall 421 is inserted in the hollow portion of the first member 41, the guide sections 422 are fitted in the inlet flow path forming sections 414 of the first member 41. Subsequently, an inlet flow path 43 for introducing the hydraulic fluid to a cyclone chamber 423 is formed by a space surrounded by the inlet flow path forming sections 414, the inlet flow path forming wall 421 and the guide sections 422. The hydraulic fluid flows into the inlet flow path 43 through the lateral openings 413 on the first member 41. An upper portion of the guide section 422 includes a steep downward inclination from one end on a circumference to another end on the circumference. The upper portion of the guide section 422 has a substantially uniform vertical thickness from the lower end of the inclination to an inflow port 424 formed as a notch on the inlet flow path forming wall 421. The hydraulic fluid having flowed into the inlet flow path 43 is guided in a circumferential direction along the inclination to the inflow port 424 and flows into the cyclone chamber 423 in a tangential direction.

An exit port 441 is provided to an inner side of the top ceiling of the first member 41. The exit port 441 is communicated with a horizontal hole section 442 formed inside the bulging portion forming the flow direction changing section 412. A vertical hole section 443 is provided to a thick portion of the cylindrical portion of the first member 41. The vertical hole section 443 is communicated with an end of the horizontal hole section 442. The other end of the horizontal hole section 442 is sealed by a plug or the like.

A projecting section 425 is vertically formed on an outer peripheral surface section 423A of the cyclone chamber 423 of the second member 42. A vertical hole section 444 formed downwardly from an attaching flange 426 and an inclination hole section 445 formed obliquely downward to communicate with the lower end of the vertical hole section 444 are bored in the projecting section 425. When the first and second members 41 and 42 are attached, the upper end of the vertical hole section 444 is communicated with the vertical hole section 443 of the first member 41. An opening of the inclination hole section 445 forms a bubble exhaust port 446 for bubbles.

The exit port 441 and the hole sections 442 to 445 form an exhaust flow path 44 for bubbles. The exhaust flow path 44 is entirely housed in the bubble removing device 40 and is not provided with an external line formed by a tube or the like.

A momentum reducing section 427 radially projecting outward is provided on a lower side of the second member 42. The momentum reducing section 427 is positioned to cover the outflow port 428 for the hydraulic fluid and includes a collar section 427A continuously formed along an outer peripheral surface section 423A of the second member 42 and a downwardly projecting section 427B downwardly projecting from a peripheral end of the collar section 427A. Several notch openings 427C are formed on the downwardly projecting section 427B with a uniform circumferential interval. The several notch openings 427C are misaligned with the outflow port 428. The hydraulic fluid flowing out through the outflow port 428 does not immediately flow through the notch openings 427C and spreads out, but hits the downwardly projecting sections 427B so that the momentum of the fluid flow is reduced before spreading into the hydraulic tank 1 through the notch openings 427C or the lower side of the downwardly projecting section 427B. Here, in the embodiment, the outflow port 428 is shaped in a manner corresponding to a direction of the swirl in the cyclone chamber 423, and an opening of the outflow port 428 is stretched over the outer peripheral surface section 423A and an end facet section 423B (see FIG. 7). With this arrangement, while the hydraulic fluid is smoothly flowed out from the cyclone chamber 423, momentum that the hydraulic fluid possesses immediately after flowing out is reduced since the hydraulic fluid securely collides with the downwardly projecting section 427B. Incidentally, the momentum reducing section 427, which is integrated with the bubble removing device 40, may be provided separately from the bubble removing device 40 and attached to an inner surface of the guide 16.

The hydraulic fluid that has flowed into the hydraulic fluid input port 411 of the bubble removing device 40 is separated to two streams in different directions at the flow direction changing section 412 and flows into the bubble removing device 40 through the lateral opening 413. Subsequently, the hydraulic fluid flows through the inlet flow path 43 between the first member 41 and the second member 42 and tangentially flows into the cyclone chamber 423 through the inflow port 424 of the second member 42.

In the cyclone chamber 423 where a swirl has been generated, if the hydraulic fluid contains bubbles, the bubbles having extremely smaller specific gravity than that of the hydraulic fluid are drawn toward an upper central portion of the cyclone chamber 423. Then, an inner pressure in the cyclone chamber 423 causes the bubbles to travel from the exit port 441 provided to an inner ceiling of the first member 41 through the exhaust flow path 44 intercommunicating the first member 41 and the second member 42 to the bubble exhaust port 446 through which the bubbles are discharged.

Figure 2:
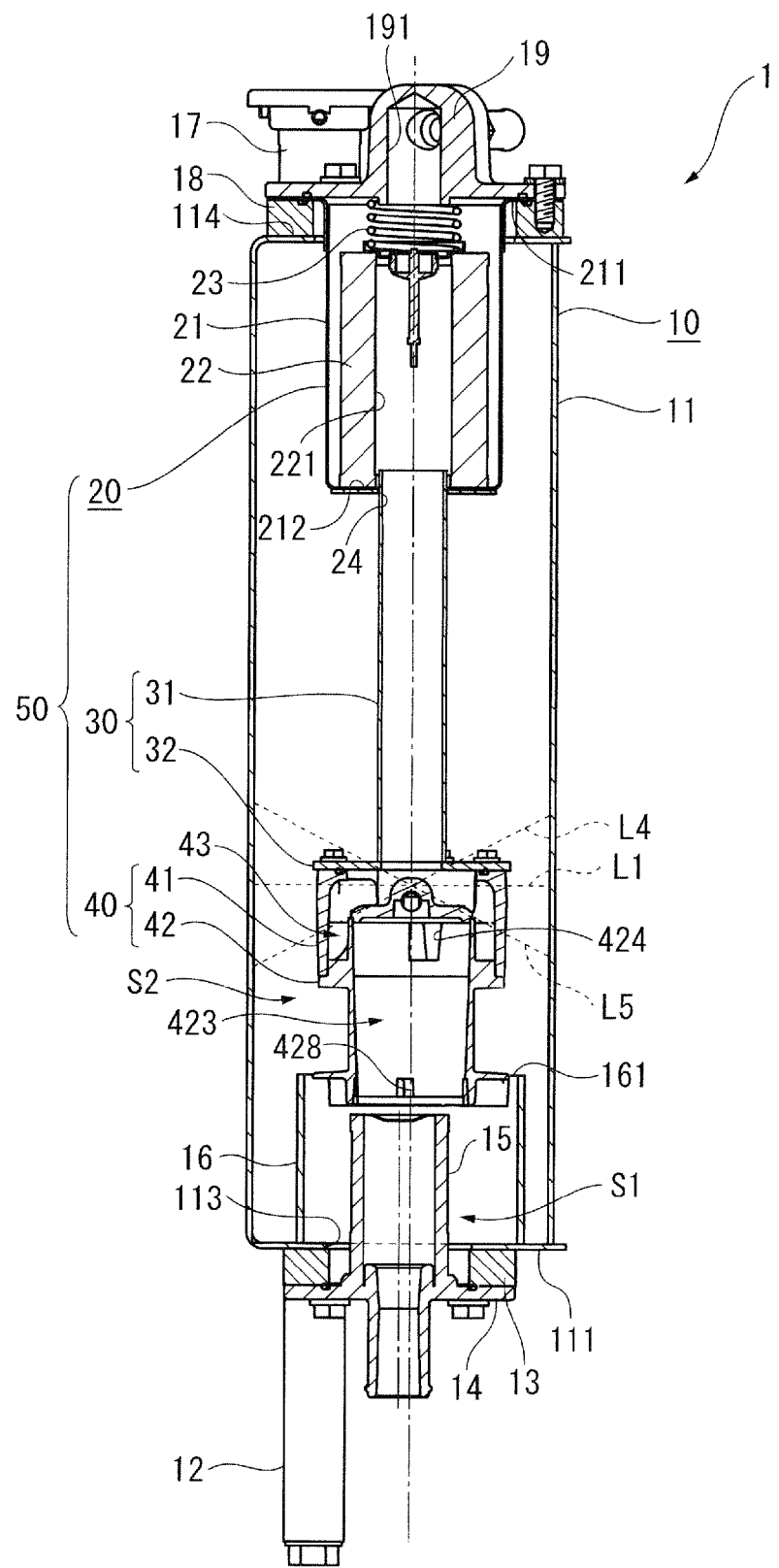
FIG. 2 is a side view showing a cross section of the fluid tank according to the first embodiment taken along II-II line in FIG. 1.

As shown in FIGS. 1 and 2, the bubble exhaust port 446 is disposed lower than the lowest fluid surface levels L1 to L5 to be opened in the hydraulic fluid at all times. With this arrangement, even when the pressure in the cyclone chamber 423 becomes negative, air above the fluid surface of the hydraulic fluid does not flow reversely through the bubble exhaust port 446. Incidentally, L1 indicates the lowest fluid surface with the hydraulic tank 1 being at a horizontal position, and L2 to L5 indicate the lowest fluid surface with the hydraulic tank 1 being at inclined positions.

The hydraulic fluid from which bubbles have been removed in the cyclone chamber 423 moves downward while generating a swirl and flows out into the hydraulic fluid in the tank through the outflow port 428 provided to a lower end of the second member 42. Because the momentum reducing section 427 which reduces the momentum that the hydraulic fluid possesses immediately after flowing out is provided around the outflow port 428, momentum of the hydraulic fluid flowing out through the outflow port 428 is prevented from causing the fluid surface to rise greatly or splash in a fountain-like manner. With this arrangement, the fluid surface does not take in air through waves generated thereon, so that generation of bubbles is suppressed. Accordingly, the bubble removal is securely conducted.

A lower end of the bubble removing device 40 on which the outflow port 428 and the momentum reducing section 427 are formed is inserted in the opening of the guide 16. The hydraulic fluid having flowed out from the outflow port 428 is guided in a feeding space S1 toward the strainer 15 by the guide 16.

In the embodiment, the bubble removing device 40 having the above-described arrangement is disposed above the strainer 15. The bubble removing device 40 and the strainer 15 partially overlap each other and are substantially linearly arranged, although the vertical central axis of the bubble removing device 40 is slightly misaligned with that of the strainer 15. In other words, the filter 20, the connecting portion 30, the bubble removing device 40, the strainer 15 and the delivery port 113 are substantially linearly arranged. With this arrangement, a width of the tank main body 10 is reduced. As a result, an installation area of the hydraulic tank 1 can be reduced. In addition, the elements in which air may be taken when the fluid surface is lowered, such as the bubble removing device 40 and the strainer 15, can be disposed closer to the center of the tank to reduce influence of the lowering of the fluid surface.

If the hydraulic fluid input port 411 of the bubble removing device 40 is, for example, opened in a direction perpendicular to the swirling axis in the cyclone chamber 423 to be formed on a lateral portion of the bubble removing device 40, the connecting portion 30 needs to be bent substantially perpendicularly. This is unfavorable not only in view of assemble efficiency. The above-mentioned advantage of reduction of an installation area of the hydraulic tank 1 due to reduction of a width of the tank main body 10 may not be taken fully.

Accordingly, if the filter 20, the connecting portion 30, the bubble removing device 40, the strainer 15 and the delivery port 113 are substantially linearly arranged, a fluid input port provided to the bubble removing device 40 for the hydraulic fluid is preferably opened in an axial direction of the swirl in the cyclone chamber 423 as is the case with the hydraulic fluid input port 411 of the present embodiment.

In the hydraulic tank 1 having the above-described arrangement, the gap G is formed between the opening 161 of the guide 16 and the bubble removing device 40 inserted into the opening 161. With this arrangement, for example, if necessity for a large amount of a hydraulic fluid arises as a piston of a cylinder is moved toward a head and feeding back the hydraulic fluid that has flowed out of the bubble removing device 40 is not enough, a hydraulic fluid contained in the out-of-guide space S2 in the hydraulic tank 1 is sucked in the feeding space S1 through the gap G and a supplementary hydraulic fluid is fed into the hydraulic circuit through the delivery port 113. Conversely, if the piston of the cylinder is moved toward a bottom to cause a large amount of the hydraulic fluid to be returned to the hydraulic tank 1 through the return port 191, the amount of the hydraulic fluid that flows to the feeding space S1 through the bubble removing device 40 is larger than the amount of the hydraulic fluid fed to the hydraulic circuit from the feeding space S1. In this case, the excessive hydraulic fluid flows into the out-of-guide space S2 through the gap G. As set forth above, the difference in the amounts of hydraulic fluid between the return from the hydraulic circuit and the feed from the delivery port 113, or in other words, the excess and deficiency of the hydraulic fluid, are adjusted. Here, if the gap G is too wide, the hydraulic fluid that contains the bubbles discharged from the bubble exhaust port 446 is also sucked in the feeding space S1. On the contrary, if the gap G is too narrow, the excess and deficiency of the hydraulic fluid are not smoothly adjusted. Thus, a dimension of the gap G is preferably approximately 5 mm.

Next, a manufacturing method of the hydraulic tank 1 will be described below. In particular, a manufacturing method of the tank main body 10 including the guide 16 and an attaching method of the path assembly 50 to the tank main body 10 will be described.

Figure 8:
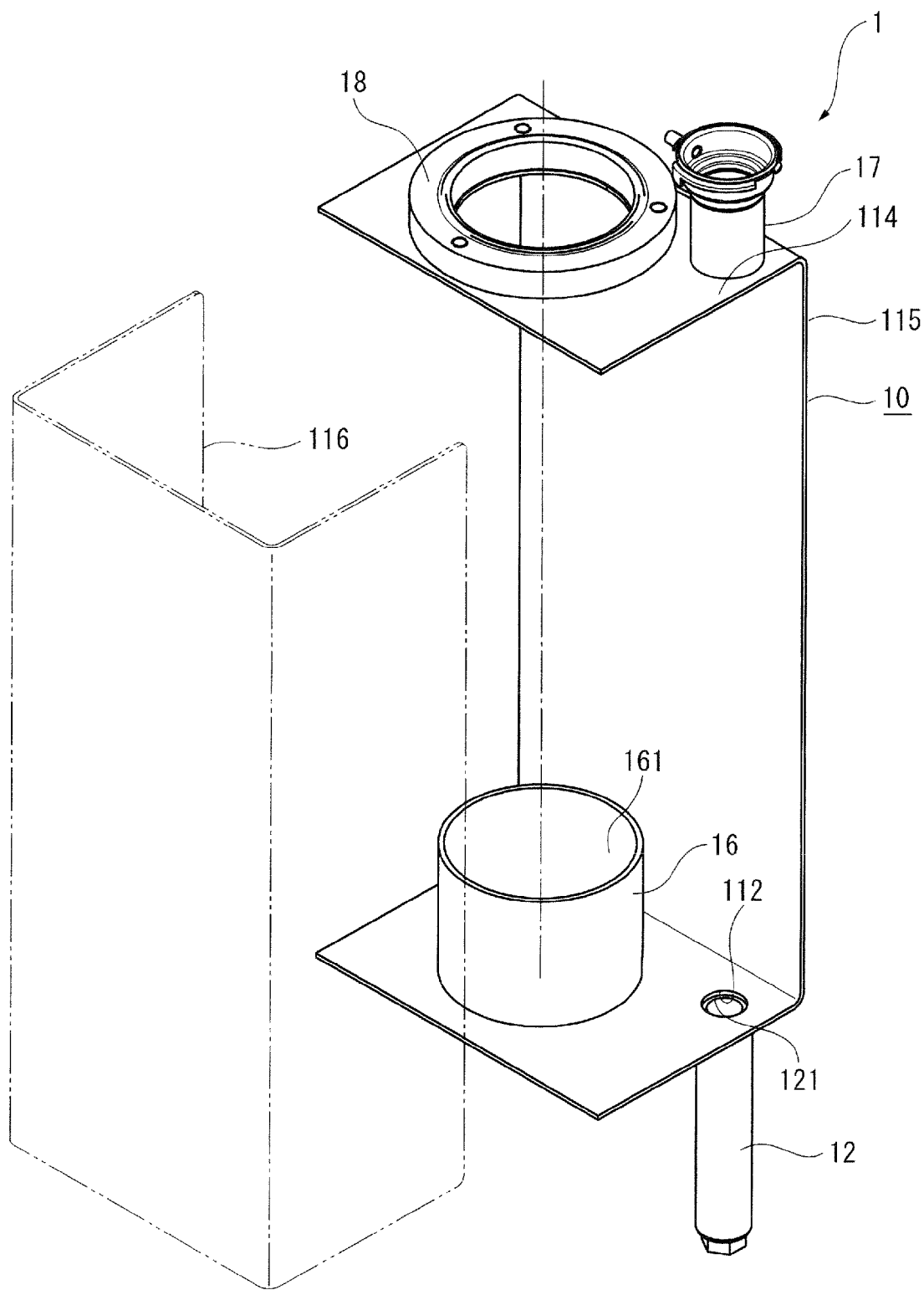
FIG. 8 is a view showing a manufacturing method of the fluid tank according to the first embodiment.

As shown in FIG. 8, at manufacturing the tank main body 10, a U-shaped first outer plate member 115 including the bottom plate 111 and the upper plate 114 and a U-shaped second outer plate member 116 combined with the first outer plate member 115 to form the tank main body 10 are prepared. It is preferable that the first outer plate member 115 have already been provided with the drain port 112, the delivery port 113, the drain pipe 12, the upper and lower flanges 13 and 18 and the fluid supply port 17.

Then, the guide 16 is positioned relative to the bottom plate 111 and welded on the bottom plate 111. Subsequently, the outer plate members 115 and 116 are combined and fixed to each other by welding.

As set forth above, because the guide 16 is welded on the bottom plate 111 of the first outer plate member 115 before the first outer plate member 115 and the second outer plate member 116 are bonded, the welding of the guide 16 can be securely conducted without interference with surroundings.

Figure 3:
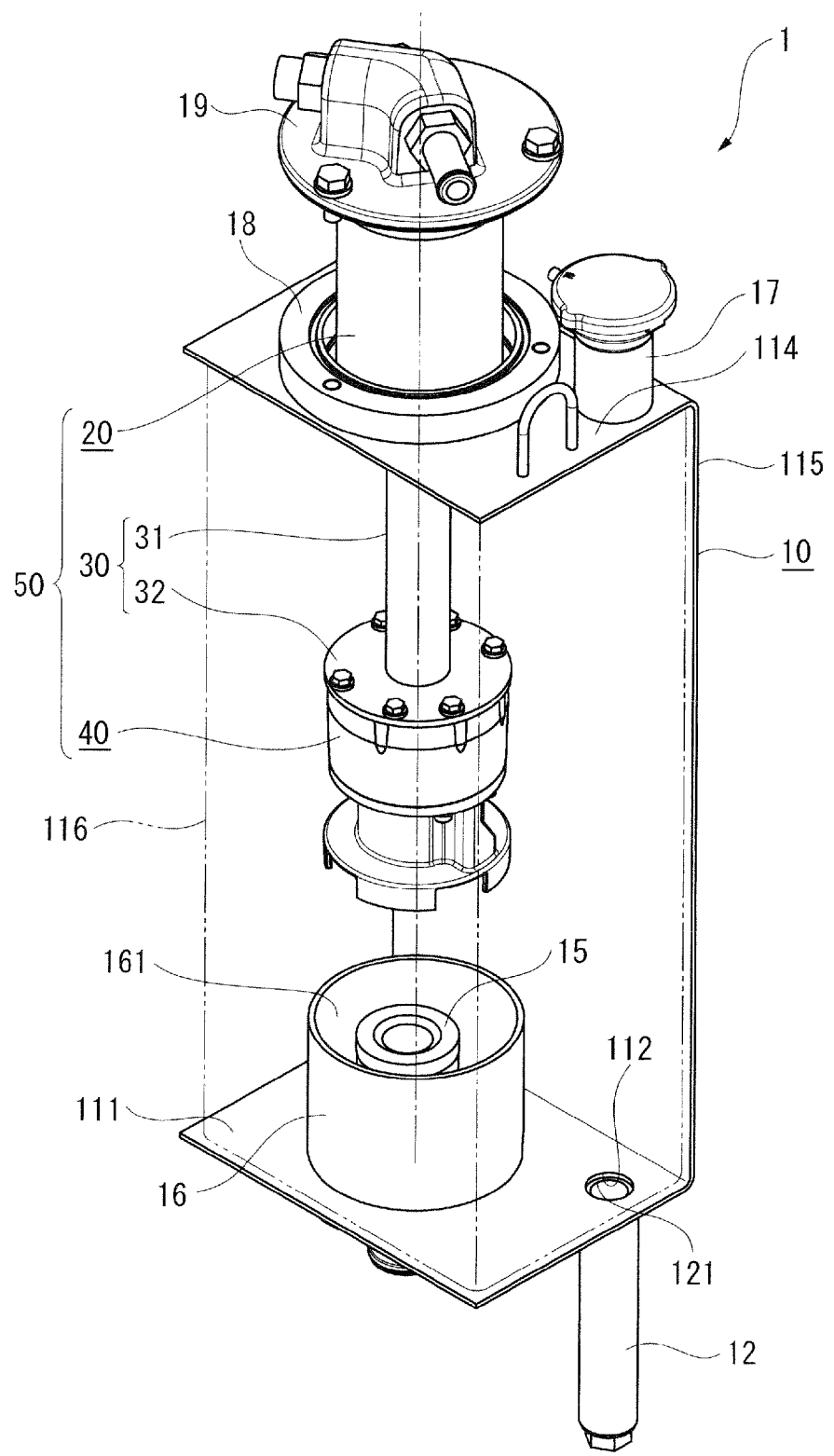
FIG. 3 is a transparent perspective view showing the fluid tank according to the first embodiment.
Figure 4:
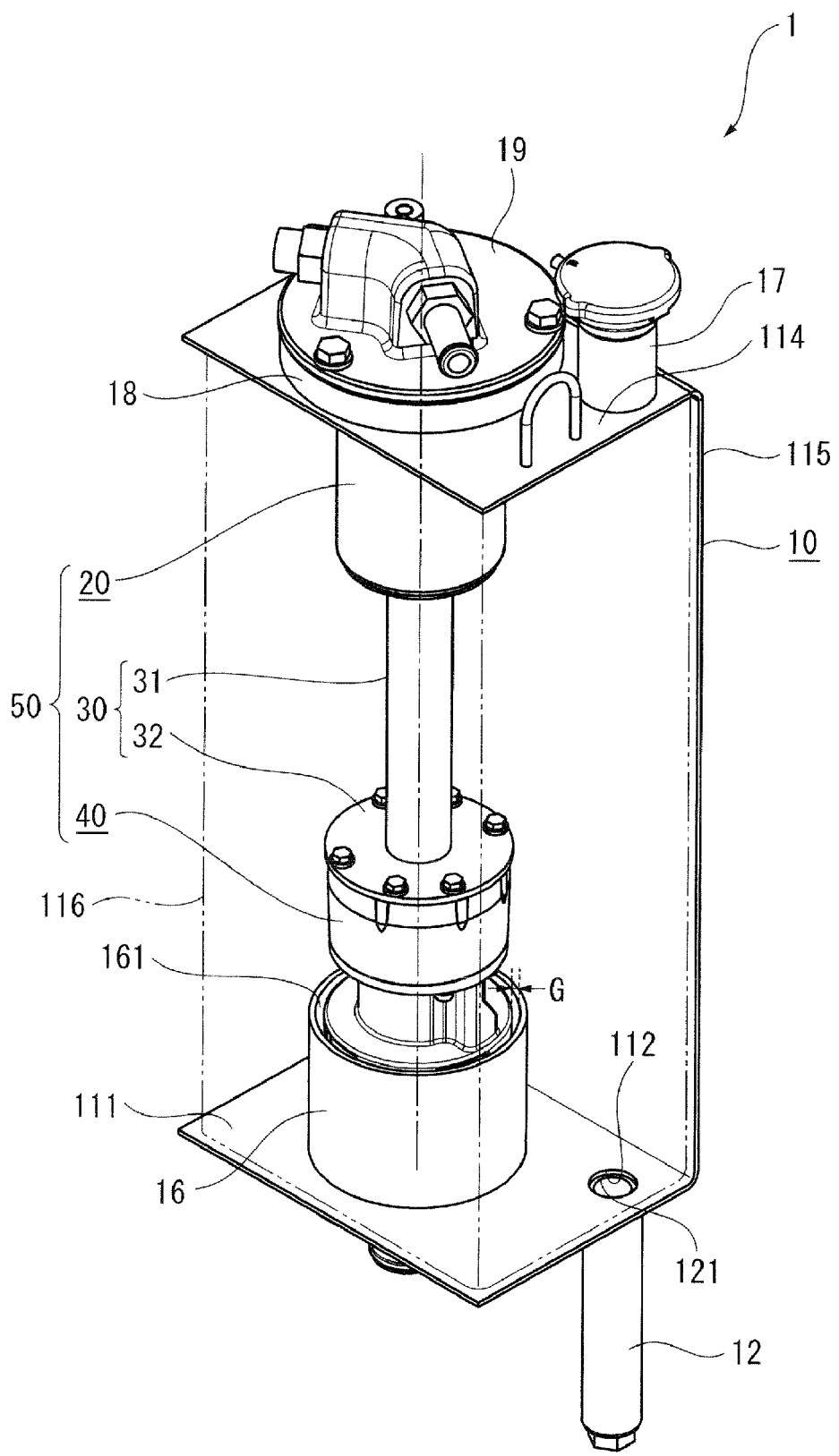
FIG. 4 is another transparent perspective view showing the fluid tank according to the first embodiment.

As shown in FIGS. 3 and 4, to attach the path assembly 50 to the tank main body 10 manufactured as described above, the path assembly 50 is put in the tank main body 10 through the upper flange 18, and the lower end of the bubble removing device 40 is inserted in the opening 161 of the guide 16. Subsequently, the path assembly 50 is bolted to the upper flange 18 together with the cover member 19. If the path assembly 50 needs to be detached from the tank main body 10 during replacement of the filter 20 or maintenance of the bubble removing device 40, the attaching operation is reversely conducted.

In this case, because the gap G is formed between the outer circumference of the bubble removing device 40 and the opening 161 of the guide 16, the bubble removing device 40 is less likely to interfere with the opening 161 when the path assembly 50 is attached to or detached from the tank main body 10. Accordingly, the attaching and detaching of the path assembly 50 are facilitated.

Second Embodiment

Figure 9:
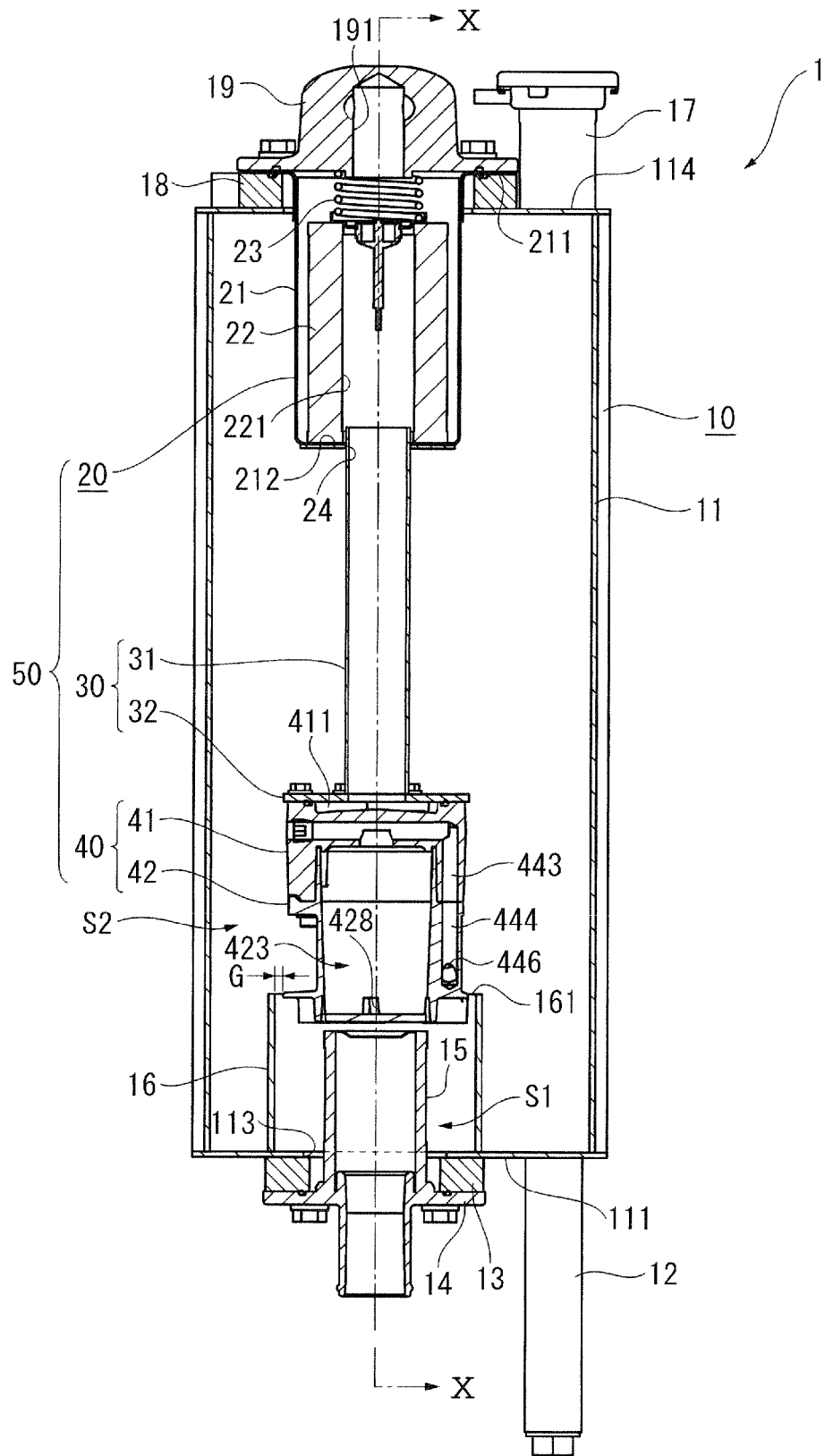
FIG. 9 is a front view showing a cross section of a fluid tank according to a second embodiment of the invention.
Figure 10:
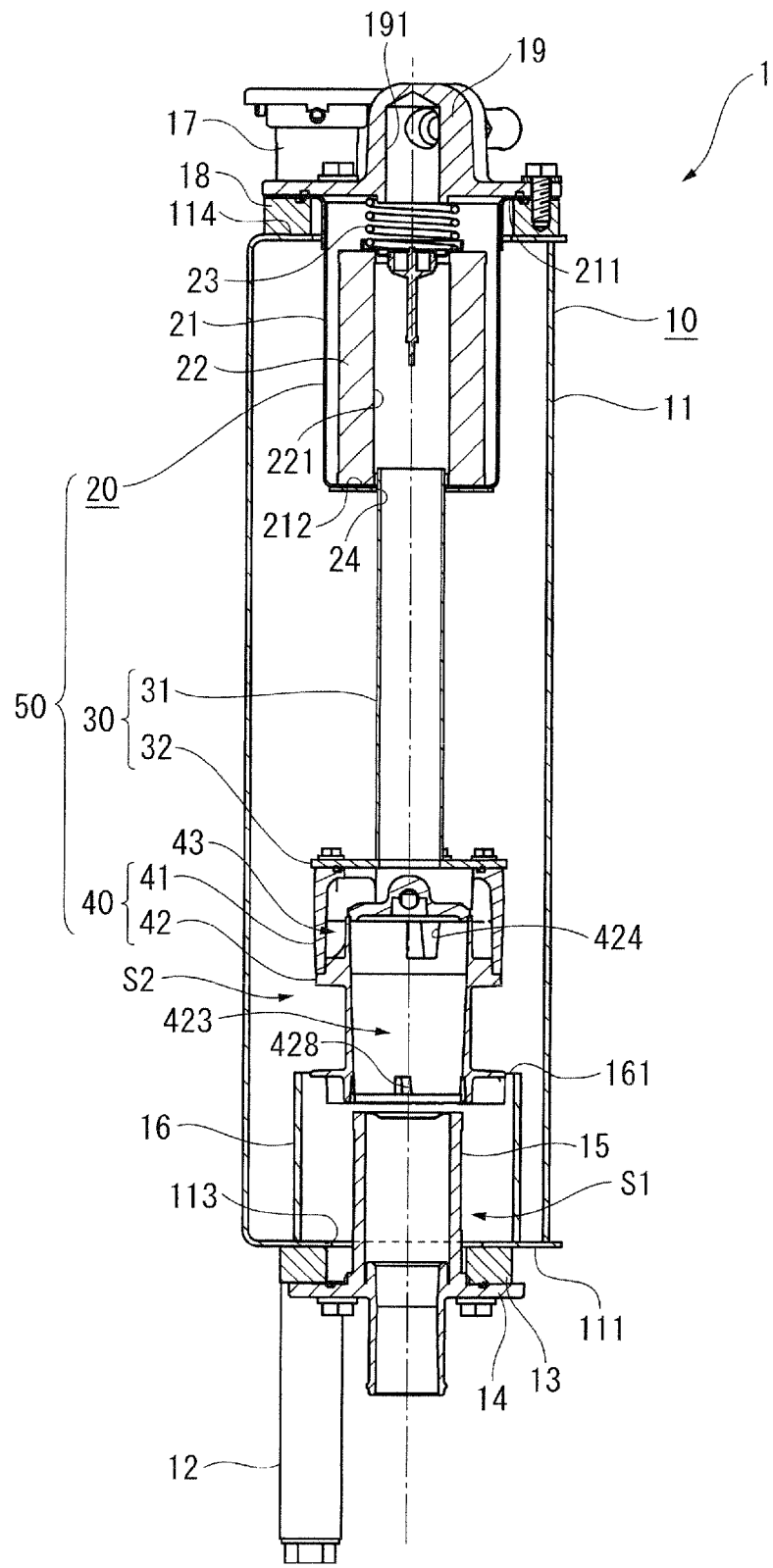
FIG. 10 is a side view showing a cross section of the fluid tank according to the second embodiment taken along X-X line in FIG. 9.

A second embodiment of the invention will be described with reference to FIGS. 9 and 10. Note that the members and the like that are the same as ones described above will be provided with the same numerals and description thereof will be omitted in the following embodiments starting from the second embodiment.

In the first embodiment, the bubble removing device 40, the delivery port 113 and the strainer 15 are substantially linearly disposed with the central axes being slightly misaligned from one another.

On the contrary, the second embodiment differs from the first embodiment in that the bubble removing device 40, the delivery port 113 and the strainer 15 are linearly disposed sharing the central axis.

Accordingly, a width of the tank main body 10 in an installed hydraulic tank 1 can be reduced to diminish an installation area of the hydraulic tank 1 from that in the first embodiment. In addition, elements that may take in air can be disposed even closer to the center of the tank to further reduce influence of the lowering of the fluid surface from that in the first embodiment.

Third Embodiment

A third embodiment of the invention will be described below with reference to FIGS. 11 and 12.

In the first and second embodiments, the bubble removing device 40, the delivery port 113 and the strainer 15 are linearly or substantially linearly disposed with the guide 16 for covering them being formed in a cylindrical shape.

On the contrary, in the third embodiment, the bubble removing device 40 and the strainer 15 are juxtaposed in a widthwise direction of the hydraulic tank 1. In other words, the bubble removing device 40, the delivery port 113 and the strainer 15 are not substantially linearly disposed. Correspondingly, the guide 16 is provided in a deformed shape.

Figure 11:
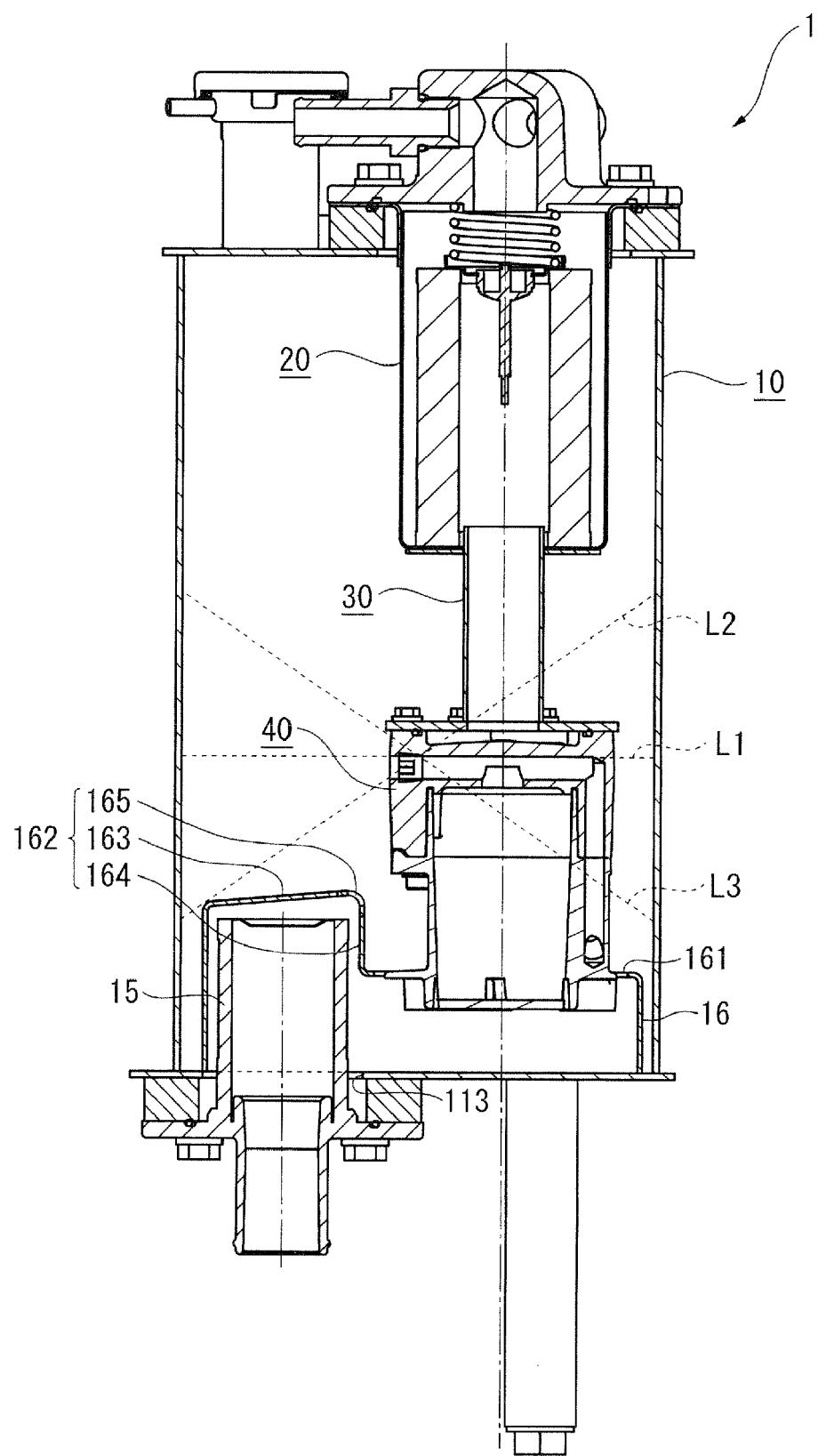
FIG. 11 is a front view showing a cross section of the fluid tank according to a third embodiment of the invention.
Figure 12:
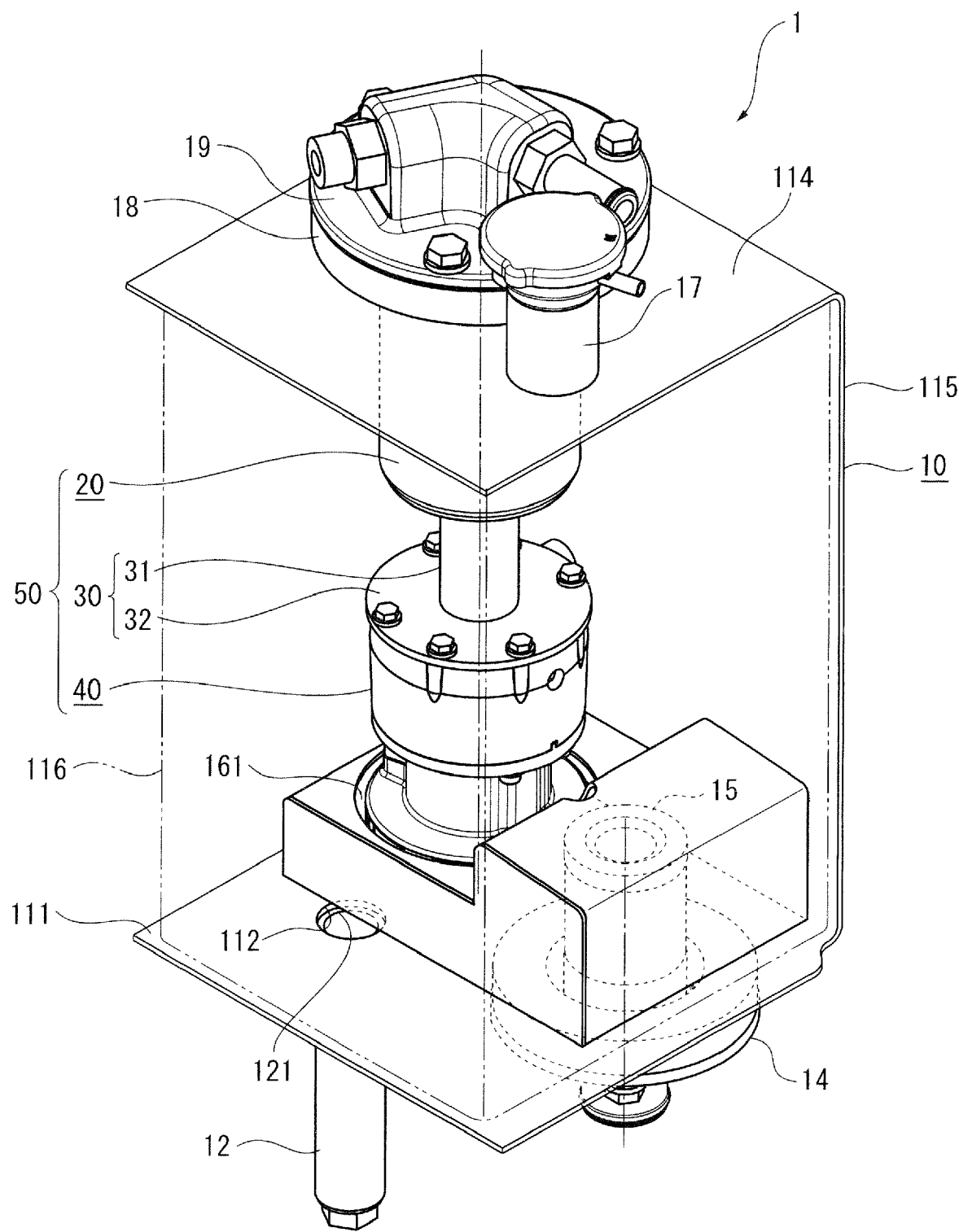
FIG. 12 is a transparent perspective view showing the fluid tank according to the third embodiment.

Specifically, as shown in FIGS. 11 and 12, the bubble removing device 40 is juxtaposed with the strainer 15 in a manner that a lower end of the bubble removing device 40 is lower than an upper end of the strainer 15.

A portion of the guide 16 where the strainer 15 is contained is shaped in a heightened step to form a protrusion 162 for covering the above-described arrangement of the bubble removing device 40, the strainer 15 and the delivery port 113 in which the strainer 15 is inserted. An upper surface 163 of the protrusion 162 is inclined upward toward the bubble removing device 40. An air vent hole 165 is provided at a periphery between the upper surface 163 and a lateral surface 164 of the protrusion 162 adjacent to the bubble removing device 40. In other words, the air vent hole 165 is provided to an uppermost portion of the continuously formed upper surface 163 of the guide 16.

As set forth above, the upper surface 163 is inclined upward toward the bubble removing device 40, that is, toward the center of the tank, and the air vent hole 165 is formed at the uppermost portion of the guide 16. With this arrangement, even if a hydraulic fluid containing bubbles unfavorably enters the feeding space S1, the bubbles are guided along the inclination of the upper surface 163 to the air vent hole 165 and discharged through the air vent hole 165 to the out-of-guide space S2. In addition, when the construction machine in which the hydraulic tank 1 is installed is accelerated or decelerated while changing a location, or when the construction machine is on an inclined surface, the fluid surface of the hydraulic fluid in the hydraulic tank 1 in a lowest state thereof as illustrated by L1 in FIG. 11 may be greatly inclined as illustrated by L2 or L3 in FIG. 11. In this case, because the air vent hole 165 is provided adjacent to the center of the hydraulic tank 1 the air vent hole 165 is not exposed to a space above the fluid surface. As a result, air can be prevented from entering the inside of the guide 16.

In addition, in the third embodiment, the drain port 112 and the opening 121, on an end of the drain pipe 12 at which the drain pipe 12 is attached to the hydraulic tank 1, are formed to be stretched over an inside and an outside of the guide 16. In other words, the opening 121 of the drain port 112 and the drain pipe 12 are stretched over the feeding space S1 and the out-of-guide space S2. Thus, the drain port 112 and the drain pipe 12 provide communication between the spaces S1 and the S2.

With this arrangement, at discharging the hydraulic fluid in the hydraulic tank 1, that is, at so-called draining, the hydraulic fluid in the feeding space S1 in the guide 16 can also be easily moved out to the outside. Furthermore, because the feeding space S1 and the out-of-guide space S2 are in communication, excess and deficiency of the hydraulic fluid in the feeding space S1 are adjusted by the drain port 112 and the drain pipe 12 similar to the adjustment of the excess and deficiency of the hydraulic fluid in the feeding space S1 via the gap G between the opening 161 of the guide 16 and the bubble removing device 40.

Fourth Embodiment

Figure 13:
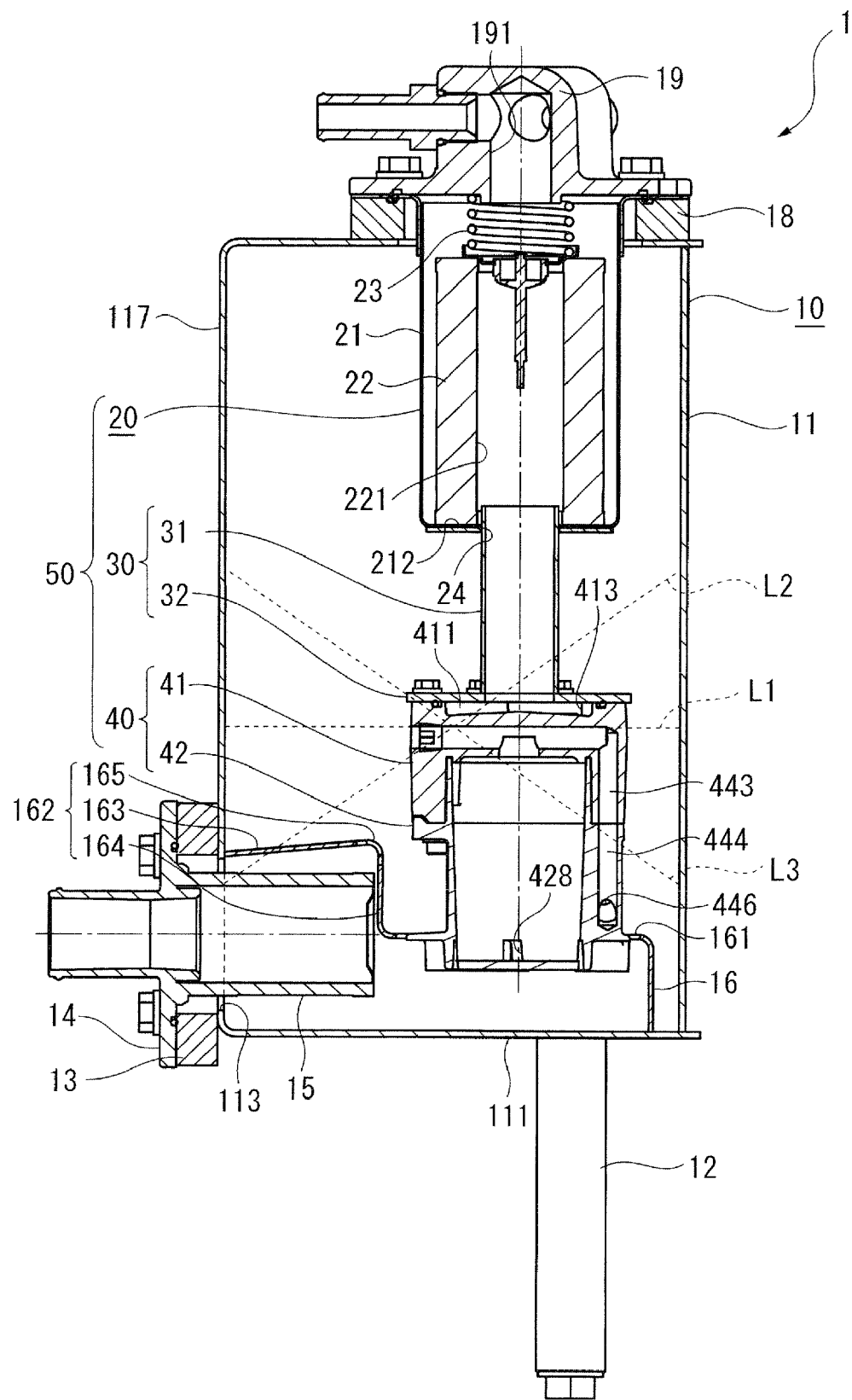
FIG. 13 is a front view showing a cross section of a fluid tank according to a fourth embodiment of the invention.

A fourth embodiment of the invention will be described below with reference to FIG. 13.

In the third embodiment described above, the delivery port 113 and the lower flange 13 are provided to the bottom plate 111 of the tank main body 10, and the joint member 14 including the strainer 15 is fixed to the bottom plate 111 via the lower flange 13.

The fourth embodiment greatly differs from the third embodiment in that the delivery port 113 and the lower flange 13 are provided to the side plate 117 of the tank main body 10, and the joint member 14 including the strainer 15 is fixed to the side plate 117 via the lower flange 13.

Such an arrangement can still provide the same effects as the third embodiment. In addition, because the joint member 14 is not projected under the hydraulic tank 1, the hydraulic tank 1 can be installed even if the spaces over and under the hydraulic tank 1 is narrow. Thus, a workload of installation designing can be reduced.

Fifth Embodiment

Next, a fifth embodiment of the invention will be described with reference to FIGS. 14 and 15.

In the first to fourth embodiments, the guide 16 for guiding the fluid from which bubbles have been removed to the delivery port 113 covers the lower portion of the bubble removing device 40, the delivery port 113 and the strainer 15 to partition the inside of the hydraulic tank 1 to the outflow port 428 side and the bubble exhaust port 446 side.

On the contrary, the fifth embodiment includes a partitioning member 16A provided in the hydraulic tank 1. The partitioning member 16A divides the inside of the hydraulic tank 1 to an upper side and a lower side, that is, the outflow port 428 side and the bubble exhaust port 446 side.

The hydraulic tank 1 according to the fifth embodiment will be specifically described below.

Figure 14:
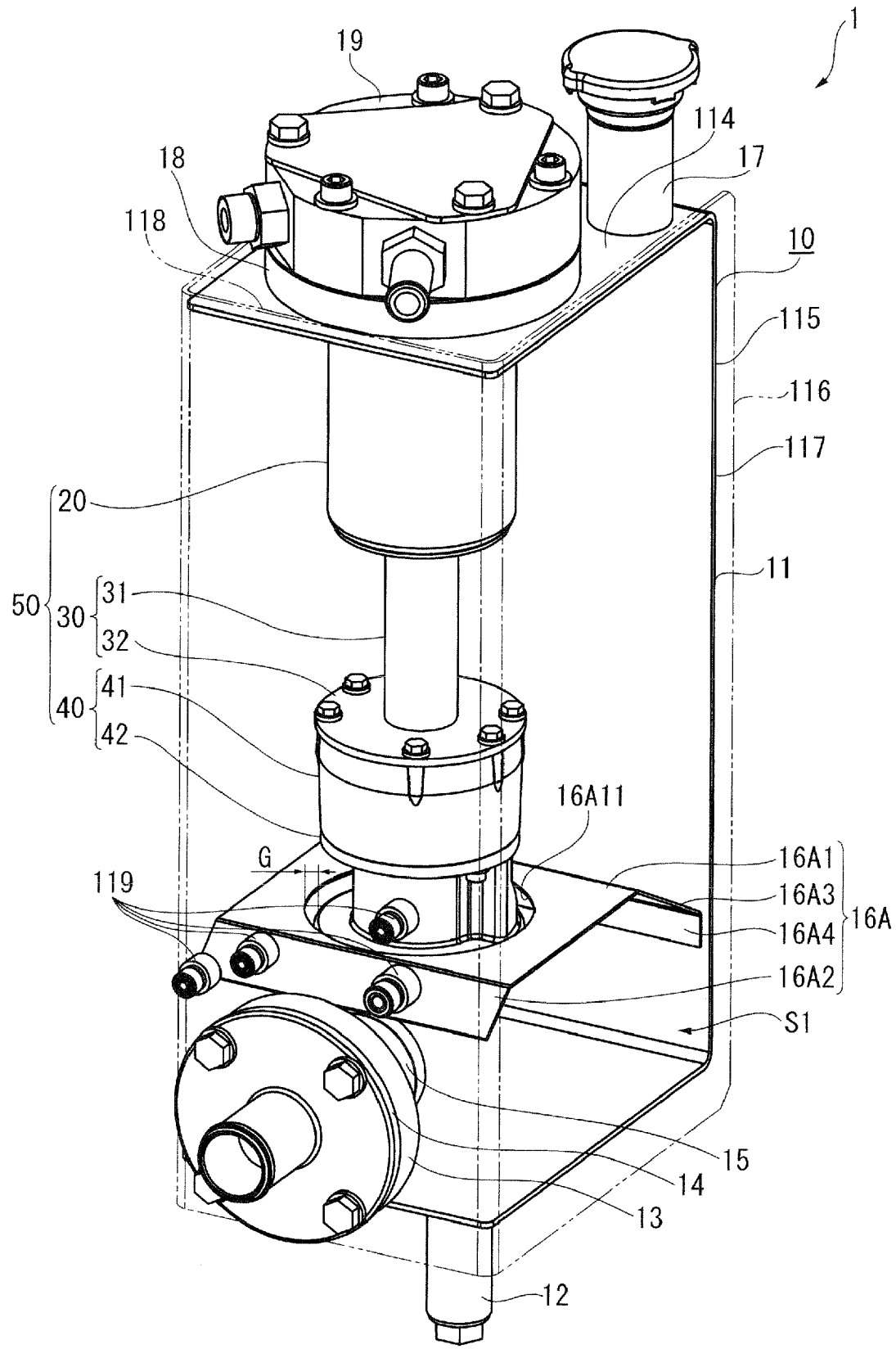
FIG. 14 is a transparent perspective view showing a fluid tank according to a fifth embodiment of the invention.
Figure 15:
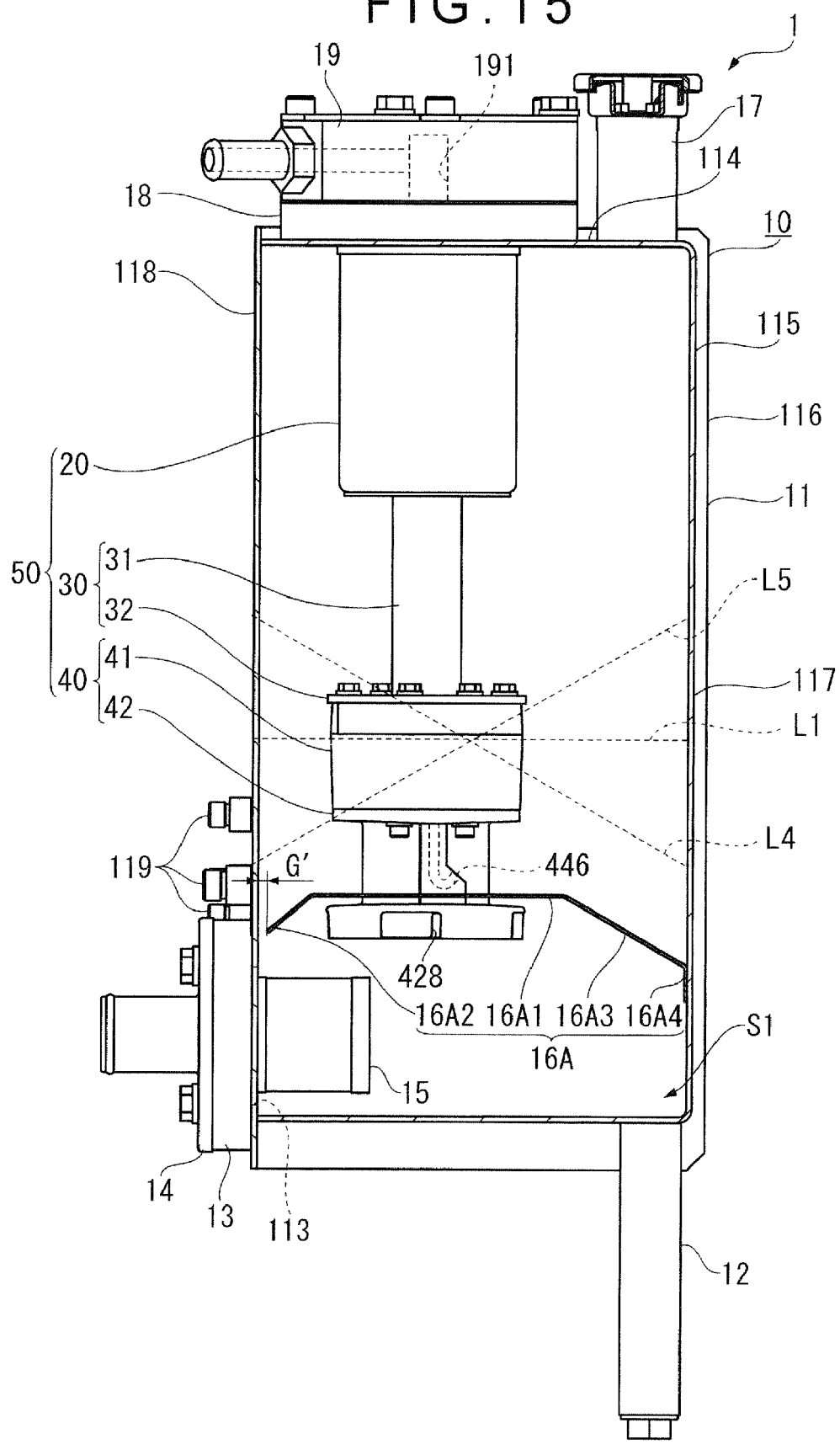
FIG. 15 is a front view showing a cross section of the fluid tank according to the fifth embodiment.

As shown in FIGS. 14 and 15, similarly to the hydraulic tanks 1 of the first to fourth embodiments, the hydraulic tank 1 includes the tank main body 10, the filter 20, the connecting portion 30 and the bubble removing device 40. The filter 20, the connecting portion 30 and the bubble removing device 40 are contained in the tank main body 10.

The tank main body 10 includes the box-shaped body 11, which is formed by the U-shaped first outer plate member 115 and the U-shaped second outer plate member 116 combined with the first outer plate member 115. The fifth embodiment differs from the first to fourth embodiments in that the second outer plate member 116 has a slightly larger height dimension and a slightly larger width dimension than those of the first outer plate member 115. Consequently, an inner wall of the second outer plate member 116 is abutted to a periphery of the first outer plate member 115 when the second outer plate member 116 is combined with the first outer plate member 115.

The cover member 19 is detachably fixed on the upper plate 114 of the body 11 via the upper flange 18. The partitioning member 16A is attached to the side plate 117 of the body 11 in a manner oriented toward an opposing side plate 118 of the U-shaped second outer plate member 116. The partitioning member 16A will be described in detail below.

In addition to the return port 191 through which the hydraulic fluid returns from the cylinder or the like of the work equipment, several subordinate return ports 119 are provided. The subordinate return ports 119 are disposed on the side plate 118 of the body 11 adjacent to the bubble exhaust port 446 of the bubble removing device 40, that is, adjacent to the upper plate 114, relative to the partitioning member 16A. In a construction machine, for example, oil of a pilot circuit for controlling a hydraulic cylinder of work equipment returns into the hydraulic tank 1 through the subordinate return port 119 without flowing through the bubble removing device 40.

In the tank main body 10 having such an arrangement, the partitioning member 16A formed by bending both ends of a single plate having a substantially rectangular shape in plan view, as shown in FIGS. 14 and 15. Specifically, the partitioning member 16A includes a central portion 16A1, a first bent portion 16A2, a second bent portion 16A3 and a mounting portion 16A4.

The central portion 16A1 is a portion near the center of the partitioning member 16A. A lower end of the bubble removing device 40 is inserted in an opening 16A11 formed in the central portion 16A1.

The first bent portion 16A2 bent relative to the central portion 16A1 is provided adjacent to a first end of the central portion 16A1, and the second bent portion 16A3 bent relative to the central portion 16A1 in the same direction as the bending direction of the first bent portion 16A2 is provided adjacent to a second end of the central portion 16A1. The first bent portion 16A2 and the second bent portion 16A3 are formed by considering inclination of the fluid surface in the hydraulic tank 1. Even if the fluid surface in the hydraulic tank 1 is inclined, the vertical position of the fluid surface is not lower than the vertical position of the partitioning member 16A.

The mounting portion 16A4 further bent in the bending direction of the second bent portion 16A3 is provided adjacent to the second bent portion 16A3 opposite to the central portion 16A1. The mounting portion 16A4 is mounted on the side plate 117 to fix the partitioning member 16A to the hydraulic tank 1.

The partitioning member 16A is attached to the hydraulic tank 1 in a manner disposing the central portion 16A1 adjacent to the upper plate 114 relative to the bent portions 16A2 and 16A3. In other words, the partitioning member 16A is attached to the hydraulic tank 1 in a manner forming a convex shape that curves upward. In plan view, a dimension of the partitioning member 16A from a distal end of the first bent portion 16A2 to the mounting portion 16A4 is smaller than an internal dimension of the hydraulic tank. With this arrangement, the partitioning member 16A is attached to the body 11 in a manner having a slight gap G' between the distal end of the first bent portion 16A2 and a wall of the body 11.

In the tank main body 10 having such an arrangement, the path assembly 50 formed by the filter 20, the connecting portion 30 and the bubble removing device 40 which are substantially linearly arranged is connected to the cover member 19 and contained in the tank main body 10. A lower end of the path assembly 50 that contains the outflow port 428 of the bubble removing device 40 is inserted in the opening 16A11 of the partitioning member 16A. The gap G having a substantially uniform width is circumferentially formed between an inner circumference of the opening 16A11 and the bubble removing device 40.

Because the bubble exhaust port 446 of the bubble removing device 40 is disposed above the partitioning member 16A, the inside of the hydraulic tank 1 is partitioned to the outflow port 428 side and the bubble exhaust port 446 side by the partitioning member 16A.

In the hydraulic tank 1 arranged as set forth above the gap G' is formed between the distal end of the first bent portion 16A2 in the partitioning member 16A and the wall of the body 11. Accordingly, the excess and deficiency of the hydraulic fluid in the feeding space S1 are adjusted by the gap G' between the partitioning member 16A and the wall of the body 11 in addition to the gap G between the inner circumference of the opening 16A11 of the partitioning member 16A and the bubble removing device 40.

Furthermore, the partitioning member 16A is formed by bending both ends of a single plate and is supported in the hydraulic tank 1 in a cantilevered manner at the mounting portion 16A4. Accordingly, the partitioning member 16A can be easily formed and can be easily mounted in the hydraulic tank 1.

Note that the scope of the invention is not limited to the above embodiments but includes other arrangements that can achieve an object of the invention. Modifications set forth below are also included in the scope of the invention.

In the first embodiment, the opening 161 of the guide 16 is simply formed by the cylindrical lateral wall of the guide 16. However, the opening 161 may be formed by providing a so-called collar, that is, an upper surface inclined from an end of the lateral wall of the guide 16 toward the bubble removing device 40. With this arrangement, in a manner similar to the third and fourth embodiments, even if the hydraulic fluid containing bubbles enters the feeding space S1, the bubbles are guided along the inclination of the upper surface to the gap G between the outer circumference of the bubble removing device 40 and the opening 161 of the guide 16 and are discharged through the gap G to the out-of-guide space S2.

In the first and second embodiments, regarding the drain port 112 and the drain pipe 12, the drain port 112 and the opening 121 on an end of the drain pipe 12 at which the drain pipe 12 is attached to the hydraulic tank 1 are not formed to be stretched over the inside and the outside of the guide 16. However, the drain port 112 and the opening 121 may be formed to be stretched over the inside and the outside of the guide 16 in a manner similar to the third and fourth embodiments.

Furthermore, in the third and fourth embodiments, the guide 16 includes the protrusion 162. However, the guide 16 may have any suitable shape that covers a predetermined portion of the delivery port 113 and the bubble removing device 40. For example, a simple box-like shape may be employed.

In the fifth embodiment, the partitioning member 16A includes the first bent portion 16A2 and the second bent portion 16A3, but this does not limit the scope of the invention. The partitioning member 16A is only required to have an inclined portion relative to the horizontal direction when mounted to the tank main body 10. For example, the central portion 16A1 may form the second bent portion 16A3. Moreover, the partitioning member 16A may include only one of the first bent portion 16A2 and the second bent portion 16A3.

In the fifth embodiment, the partitioning member 16A partitions the inside of the hydraulic tank 1 to two sides, but this does not limit the scope of the invention. For example, the hydraulic tank 1 partitioned to two sides may be further partitioned.

Moreover, in the fifth embodiment, the partitioning member 16A partitions the inside of the hydraulic tank 1 to the upper side and the lower side, but this does not limit the scope of the invention. The partitioning member 16A is included in the scope of the invention as long as the partitioning member 16A partitions the inside of the hydraulic tank 1 to the side of the delivery port 113 and the outflow port 428 and the side of the bubble exhaust port 446.

In the fifth embodiment, the gap G' is formed between the distal end of the first bent portion 16A2 of the partitioning member 16A and the wall of the body 11, but this does not limit the scope of the invention. For example, the gap G' may be formed between a periphery of a portion stretching from the first bent portion 16A2 to the second bent portion 16A3 and the wall of the body 11.

Moreover, in the fifth embodiment, the partitioning member 16A is mounted on the side plate 117 and supported in a cantilevered manner, but this does not limit the scope of the invention. The partitioning member 16A can be mounted in any suitable manner easily known by analogy. Accordingly, the partitioning member 16A is only required to partition the inside of the tank main body 10 to the side in which the outflow port 428 and the delivery port 113 are provided and the side of the bubble exhaust port 446. For example, four corners of the partitioning member 16A may be welded on the second outer plate member 116 to be attached to the second outer plate member 116. In this case, the mounting portion 16A4 does not need to be provided to the partitioning member 16A. As a result, the shape of the partitioning member 16A can be simplified.

In the fifth embodiment, several subordinate return ports 119 are provided, but this does not limit the scope of the invention. Only one subordinate return port 119 may be provided.

The subordinate return ports 119 are provided to the side plate 118, but this does not limit the scope of the invention. For example, the subordinate return ports 119 may be provided to the upper plate 114.

Furthermore, the subordinate return port 119 does not need to be disposed in the hydraulic fluid in the hydraulic tank 1. For example, the subordinate return port 119 may be provided above the fluid surface.

In other words, the subordinate return port 119 may be provided to any suitable location as long as the location is adjacent to the bubble exhaust port 446 relative to the partitioning member 16A.

Incidentally, the hydraulic tank 1 for containing the hydraulic fluid is described in the embodiments, but this does not limit the scope of the invention. Any suitable fluid tank used to contain fluid and houses a bubble removing device for removing bubbles in the fluid, such as a fuel tank, may be employed.

The best arrangements, methods and the like for carrying out the invention has been disclosed hereinabove, but this does not limit the scope of the invention. The invention is specifically illustrated and described mainly regarding specific embodiments but those skilled in the art may make various modifications on detailed arrangements of the invention with respect to the above embodiments without departing from the scope of a technical idea and an object of the invention.

The invention claimed is:

1. A fluid tank that contains a fluid, comprising:
a tank main body that contains the fluid; and
a bubble removing device that is provided to an inside of the tank main body and removes bubbles contained in the fluid,
wherein:
the tank main body comprises a partition that partitions the inside of the tank main body into at least two sides, and a delivery port through which the fluid is fed to an outside,
the bubble removing device comprises an outflow port through which the fluid from which the bubbles have been removed flows to the inside of the tank main body and a bubble exhaust port through which the bubbles that have been removed are discharged to the inside of the tank main body,
at least one subordinate return port, through which fluid not flowing through the bubble removing device returns to the inside of the tank main body, is provided adjacent to the bubble exhaust port relative to the partition,
the delivery port is provided adjacent to the outflow port relative to the partition, and the partition partitions the inside of the tank main body into a side in which the outflow port and the delivery port are provided and a side in which the bubble exhaust port is provided.

2. The fluid tank according to claim 1, wherein the partition is fixed to the tank main body.

3. The fluid tank according to claim 1, wherein the partition partitions the inside of the tank main body into an upper side and a lower side.

4. The fluid tank according to claim 1, wherein the partition is attached to the tank main body in a manner forming a convex shape that curves upward.

5. The fluid tank according to claim 1, wherein the bubble exhaust port is provided in the fluid in the inside of the tank main body.

6. The fluid tank according to claim 1, wherein the partition comprises an opening in which the bubble removing device is inserted, and a gap having a substantially uniform width is circumferentially formed between an inner circumference of the opening and an outer circumference of the bubble removing device inserted in the opening.

7. The fluid tank according to claim 6, wherein the partition is a guide that covers surroundings of the bubble removing device and the delivery port and guides the fluid from which the bubbles have been removed by the bubble removing device to the delivery port.

8. The fluid tank according to claim 7, further comprising:
a filter that filters the fluid, wherein the guide is cylindrical, and the filter, the bubble removing device, the guide and the delivery port are substantially linearly disposed.

9. The fluid tank according to claim 8, further comprising:
a drain port through which an internal hydraulic fluid is drained, wherein the drain port is stretched over an inside and an outside of the guide.

10. The fluid tank according to claim 7, wherein the guide is shaped in a box having an inclined upper surface, and an air vent hole is provided to an uppermost portion continued from the upper surface.

11. The fluid tank according to claim 10, wherein the air vent hole of the guide is provided substantially at the center of the tank main body with respect to a horizontal direction.

12. The fluid tank according to claim 11, further comprising:
a drain port through which an internal hydraulic fluid is drained, wherein the drain port is stretched over an inside and an outside of the guide.

13. The fluid tank according to claim 10, further comprising:
a drain port through which an internal hydraulic fluid is drained, wherein the drain port is stretched over an inside and an outside of the guide.

14. The fluid tank according to claim 7, further comprising:
a drain port through which an internal hydraulic fluid is drained, wherein the drain port is stretched over an inside and an outside of the guide.

* * * * *